United States Patent
Wang et al.

(10) Patent No.: US 10,445,905 B2
(45) Date of Patent: Oct. 15, 2019

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventors: Lu Wang, Shanghai (CN); Patrick Kling, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 144 days.

(21) Appl. No.: 15/318,320

(22) PCT Filed: Mar. 31, 2016

(86) PCT No.: PCT/CN2016/078035
§ 371 (c)(1),
(2) Date: Dec. 12, 2016

(87) PCT Pub. No.: WO2017/166187
PCT Pub. Date: Oct. 5, 2017

(65) Prior Publication Data
US 2018/0158217 A1    Jun. 7, 2018

(51) Int. Cl.
*G06T 11/00* (2006.01)
*G06T 1/00* (2006.01)

(52) U.S. Cl.
CPC .......... *G06T 11/008* (2013.01); *G06T 11/006* (2013.01); *G06T 1/0007* (2013.01); *G06T 2207/10081* (2013.01); *G06T 2211/412* (2013.01)

(58) Field of Classification Search
None
See application file for complete search history.

(56) References Cited

U.S. PATENT DOCUMENTS

| | | | |
|---|---|---|---|
| 5,862,198 A | 1/1999 | Samarasekera et al. | |
| 6,768,782 B1 * | 7/2004 | Hsieh | A61B 6/032 378/4 |
| 7,672,424 B2 | 3/2010 | Ziegler et al. | |
| 8,189,735 B2 | 5/2012 | Khare et al. | |
| 8,675,936 B2 | 3/2014 | Vija et al. | |

(Continued)

OTHER PUBLICATIONS

International Search Report in PCT/CN2016/078035 dated Dec. 28, 2016, 5 pages.

(Continued)

*Primary Examiner* — Nancy Bitar
(74) *Attorney, Agent, or Firm* — Metis IP LLC

(57) ABSTRACT

The present disclosure relates to a system and method for generating an image. At least one processor, when executing instructions, may perform one or more of the following operations. When raw data relating to an object is retrieved, an image may be generated based thereon. A first voxel of the image is identified based a first geometric parameter relating to the first voxel; a second voxel of the image is identified based on a second geometric parameter relating to the second voxel; the image is reconstructed using an iterative reconstruction process, during which the calculation relating to the first voxel is based on the first number of sub-voxels, and the calculation relating to the second voxel is based on the second voxel.

17 Claims, 16 Drawing Sheets

(56) References Cited

U.S. PATENT DOCUMENTS

| | | | |
|---|---|---|---|
| 8,798,228 B2 | 8/2014 | Chandrashekarappa et al. | |
| 8,903,152 B2 | 12/2014 | Asma et al. | |
| 8,913,805 B2* | 12/2014 | Long | G06T 11/006 382/128 |
| 9,709,513 B2* | 7/2017 | O'Hare | G01N 23/046 |
| 2012/0051626 A1* | 3/2012 | Long | G06T 11/006 382/154 |
| 2013/0343673 A1* | 12/2013 | Pal | G06T 11/003 382/298 |
| 2014/0212018 A1* | 7/2014 | Hein | G06T 11/008 382/132 |
| 2015/0221124 A1 | 8/2015 | Noo et al. | |
| 2016/0225169 A1* | 8/2016 | Bippus | G06T 11/006 |
| 2018/0204305 A1 | 7/2018 | Wang et al. | |

OTHER PUBLICATIONS

Written Opinion in PCT/CN2016/078035 dated Dec. 28, 2016, 4 pages.

The partial supplementary European search report in Europen Application No. 16815531.5 dated Jun. 28, 2018, 12 pages.

Yong Long et al, 3D Forward and Back-Projection for X-Ray CT Using Separable Footprints. IEEE Transactions on Medical Imaging , 11:(29) 1839-1850, (2010).

* cited by examiner

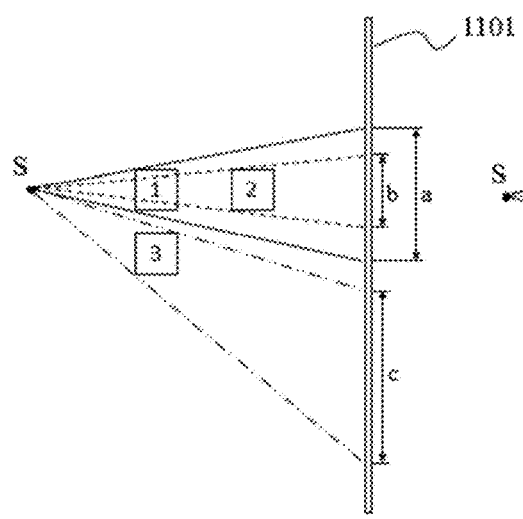 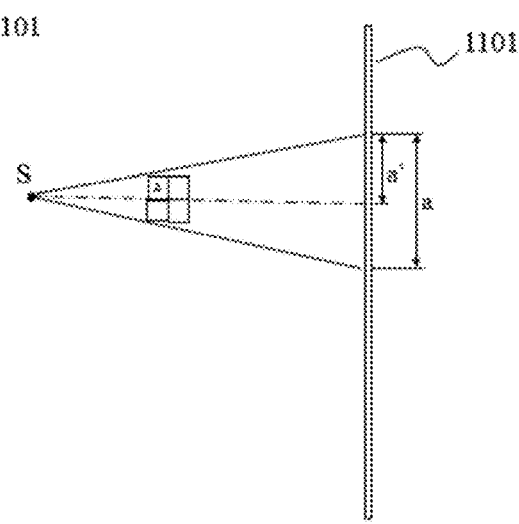
FIG. 11-A  FIG. 11-B

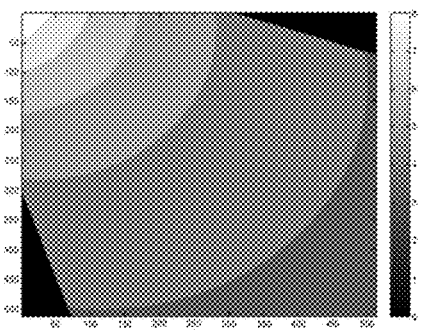 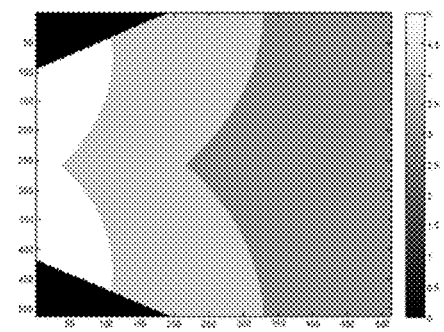
FIG. 12-A                    FIG. 12-B

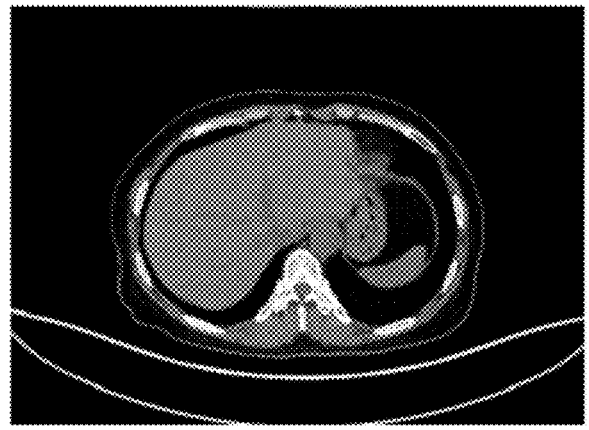
FIG. 16-A
FIG. 16-B
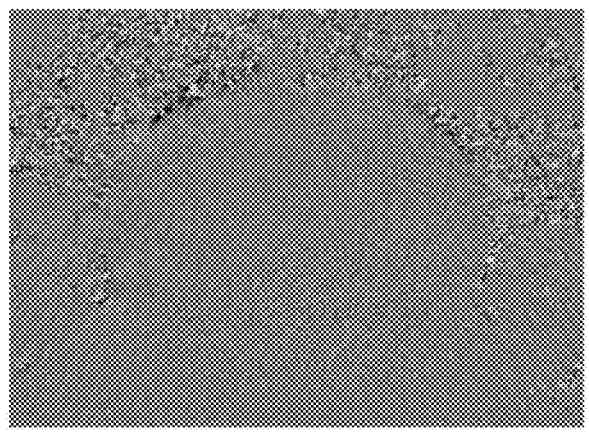
FIG. 16-C

SYSTEM AND METHOD FOR IMAGE RECONSTRUCTION

CROSS-REFERENCE TO RELATED APPLICATIONS

This present application is a U.S. national stage under 35 U.S.C. § 371 of International Application No. PCT/CN2016/078035, filed on Mar. 31, 2016, designating the United States of America, the contents of which are hereby incorporated by reference.

TECHNICAL FIELD

The present disclosure relates to image processing, and more particularly, relates to a system and method for image reconstruction.

BACKGROUND

With the rapid developments of radiation-based imaging technologies including, for example, CT technologies, and the expansion of their new clinical and industrial applications, the calculation speed during an image reconstruction may pose a challenge.

Image reconstruction may introduce artifacts to generated CT images. The contribution of a certain voxel to reconstructing an image may depend on, for example, the voxel value and a relevant contribution factor. The relevant contribution factor may be determined by the location of the voxel in a coordinate system of the detector.

SUMMARY OF THE INVENTION

Some embodiments of the present disclosure relates to a method for image reconstruction, for example, a computed tomography (CT) image. The method may include one or more of the following operations. Raw data relating to a scanned portion of an object may be received. An image may be generated based on the received raw data. The voxels of the generated image may be identified as different kinds of voxels according to the geometric parameter relating to the voxels. A first voxel of the image may be identified based on a first geometric parameter relating to the first voxel, and the first voxel may be divided into a first number of sub-voxels. A second voxel may be identified based on a second geometric parameter relating to the second voxel. The image may be reconstructed using an iterative reconstruction process comprising a plurality of iterations. During an iteration of the plurality of iterations, the calculation relating to the first voxel may be based on the first number of sub-voxels, while the calculation relating to the second voxel may be based on the second voxel. In some embodiments, the first geometric parameter may comprise a first footprint shadow range projected by the first voxel on at least one detector cell, and the footprint shadow range may exceed a first threshold. In some embodiments, the first threshold may relate to the dimension of the detector cell. In some embodiments, a third voxel may be identified based on a third geometric parameter relating to the third voxel. The third voxel may be divided into a third number of sub-voxels. The third number may be different from the first number. And during an iteration of the plurality of iterations when reconstructing the image, the calculation relating to the third voxel may be based on the third number of sub-voxels. In some embodiments, the third geometric parameter may comprise a third foot print shadow range projected by the third voxel on at least one detector cell, and the third footprint shadow range may exceed a third threshold. In some embodiments, a fourth voxel of the image may be identified based on a plurality of neighboring voxels. When reconstructing the image, the fourth voxel may be omitted during one or more iterations of the plurality of iterations. In some embodiments, a local average value relating to the neighboring voxels of the fourth voxel may exceed a fourth threshold, or match a first reference value in a first look-up table and a second reference value in a second look-up table. The fourth voxel may represent a portion corresponding to an air portion or a couch area in the object, and the value of the fourth voxel may be predetermined.

Some embodiments of the present disclosure relates to a method for image reconstruction, for example, a computed tomography (CT) image. The method may include one or more of the following operations. Raw data relating to a scanned portion of an object may be received. An image may be generated based on the received raw data. A first voxel of the image may be identified based on a plurality of neighboring voxels. The image acquired before may be reconstructed using an iterative reconstruction process comprising a plurality of iterations, and the first voxel may be omitted during one or more iterations of the plurality of iterations. In some embodiments, the value of the first voxel may be predetermined.

Some embodiments of the present disclosure relates to an image reconstructing system (for example, a system for reconstructing computed tomography (CT) images) including a data acquisition unit, a shadow range calculator, a voxel division module, and an image processing module. The system may be configured to reconstruct an image of a scanned portion. An image may be constructed when the data acquisition unit receives raw data relating to a scanned portion. The footprint shadow range of a first voxel and a second voxel of the image may be calculated by the shadow range calculator. The first voxel may be divided into a first number of sub-voxels by the voxel division module. The image may be reconstructed by the image processing module using an iterative reconstruction process, which may comprise a plurality of iterations. During each of the iterations, the calculation relating to the first voxel may be based on the first number of sub-voxels, while the calculation relating to the second voxel may be based on the second voxel. In some embodiments, the system may also comprise a mask generator. A third voxel of the image may be identified by the mask generator based on a plurality of neighboring voxels. And during one or more iterations of the plurality iterations when reconstructing the image, the third voxel may be omitted. In some embodiments, the system may comprise an air voxel assessment unit to assess a local average value of the third voxel representing a portion corresponding to air portion in the scanned portion. In some embodiments, the system may comprise a prior object voxel assessment unit to assess a local average value of the third voxel representing a couch area in the scanned portion.

Some embodiments of the present disclosure relates to an image reconstructing system (for example, a system for reconstructing computed tomography (CT) images) including a storage medium, at least one processor. The storage medium may be used to store instructions. When executing the instructions, at least one processor may be caused to perform following operations. Raw data relating to a scanned portion of an object may be received. An image may be generated based on the received raw data. A first voxel of the image may be identified based on a first geometric parameter relating to the first voxel. The first voxel may be divided into a first number of sub-voxels. A second voxel may be identified based on a second geometric parameter relating to the second voxel. The image may be reconstructed using an iterative reconstruction process comprising a plurality of iterations. During an iteration of the plurality of iterations, the calculation relating to the first voxel may be based on the first number of sub-voxels, while the calculation relating to the second voxel may be based on the second voxel.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11-A and FIG. 11-B illustrate exemplary footprint shadow ranges of forward/backward projection according to some embodiments of the disclosure;

FIG. 12-A and FIG. 12-B illustrate exemplary footprint shadow ranges according to some embodiments of the present disclosure;

FIG. 16-A and FIG. 16-B are two X-ray images generated based on iterative reconstruction according to some embodiments of the present disclosure; and FIG. 16-C shows the differences of the corresponding positions of FIG. 16-A and FIG. 16-B according to some embodiments of the present disclosure.

DETAILED DESCRIPTION

Figure 1:
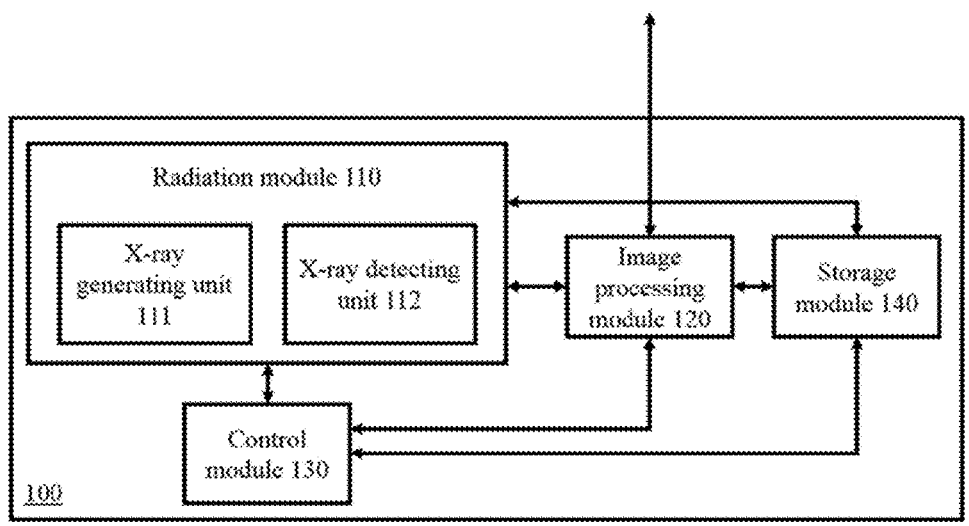
FIG. 1 is a block diagram of an X-ray imaging system according to some embodiments of the present disclosure.

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "construction" and "reconstruction," when used in this disclosure, may represent a similar process in which an image may be transformed from data. Moreover, the phrase "image processing" and the phrase "image generation" may be used interchangeably. In some embodiments, image processing may include image generation.

The present disclosure provided herein relates to image processing. Specifically, the present disclosure relates to a system and method for image reconstruction and optimization to obtain improved images, for example, CT images. Noise and/or the contrast of an image may have an impact on image quality. The object parameterization selected for image reconstruction may influence the constructed image as well. The present disclosure provides an image reconstruction method and system having features including, for example, de-discretization object parameterization, a noise model selection for noise reduction, contrast enhancement, or the like, or a combination thereof. Some description of the present disclosure are provided in connection with computed tomography (CT) images. It is understood that it is for illustration purposes, and not intended to limit the scope of the present disclosure. The system and method disclosed herein may be used for processing images or image data from other imaging modalities including, for example, a digital radiography (DR) system, a multi-modality system, or the like, or any combination thereof. Exemplary multi-modality system may include a computed tomography-positron emission tomography (CT-PET) system, a computed tomography-magnetic resonance imaging (CT-MRI) system, etc.

FIG. 1 is a block diagram of an X-ray imaging system 100 according to some embodiments of the present disclosure. It should be noted that the X-ray imaging system described below is merely provided for illustrating an example of a radiation imaging system, and not intended to limit the scope of the present disclosure. The radiation used herein may include a particle ray, a photon ray, or the like, or any combination thereof. The particle ray may include neutron, proton, electron, μ-meson, heavy ion, or the like, or any combination thereof. The photon beam may include X-ray, γ-ray, α-ray, β-ray, ultraviolet, laser, or the like, or any combination thereof. For illustration purposes, an X-ray imaging system is described as an example of a radiation imaging system. The X-ray imaging system may find its applications in different fields such as, for example, medicine or industry. Merely by way of example, the X-ray imaging system may be a computed tomography (CT) system, a digital radiography (DR) system, a multi-modality system, or the like, or any combination thereof. Exemplary multi-modality system may include a computed tomography-positron emission tomography (CT-PET) system, a computed tomography-magnetic resonance imaging (CT-MRI) system, etc. As another example, the system may be used in internal inspection of components including e.g., flaw detection, security scanning, failure analysis, metrology, assembly analysis, void analysis, wall thickness analysis, or the like, or any combination thereof.

As illustrated in FIG. 1, the X-ray imaging system 100 may include, a radiation module 110, an image processing module 120, a control module 130, and a storage module 140. The radiation module 110 may include an X-ray generating unit 111 and an X-ray detecting unit 112. In some embodiments, the control module 130 may control the X-ray generating unit 111 and/or the X-ray detecting unit 112 of the radiation module 110, the image processing module 120, and/or the storage module 140. The image processing module 120 may process information received from the radiation module 110, the control module 130, and/or the storage module 140. The image processing module 120 may generate one or more CT images based on the information and deliver the images for display. The storage unit 140 may be configured or used to store information received from the image processing module 120, the control module 130, and/or the radiation module 110. The radiation module 110, the control module 130, the image processing module 120, and the storage module 140 may be connected with each other directly, or with an intermediate unit (not shown in FIG. 1). The intermediate unit may be a visible component or an invisible field (radio, optical, sonic, electromagnetic induction, etc.). The connection between different units may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof.

It should be noted that the above description about the radiation system is merely an example, should not be understood as the only embodiment. To those skilled in the art, after understanding the basic principles of the connection between different units, the units and connection between the units may be modified or varied without departing from the principles. The modifications and variations are still within the scope of the current disclosure described above. In some embodiments, these units may be independent, and in some embodiments, part of the units may be integrated into one unit to work together.

The radiation module 110 may be configured or used to scan an object (not shown in FIG. 1) under examination and generate the raw data of an image. The object may include a substance, a tissue, an organ, a specimen, a body, or the like, or any combination thereof. In some embodiments, the object may include a patient or a part thereof. The object may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. The X-ray generating unit 111 may be configured or used to generate X-rays to traverse the object under examination. The X-ray generating unit 111 may include an X-ray generator, a high-voltage generator, and/or other accessories. The X-ray generator may include one or more X-ray tubes. An X-ray tube may emit X-rays (or referred to as X-ray beams) by an X-ray tube. The X-ray generating unit 111 may be a cold cathode ion tube, a high vacuum hot cathode tube, a rotating anode tube, etc. The shape of the emitted X-ray beams may be a line, a narrow pencil, a narrow fan, a fan, a cone, a wedge, or the like, or an irregular shape, or any combination thereof. An X-ray tube in the X-ray generating unit 111 may be fixed at a location. An X-ray tube may be translated or rotated in some scenarios.

The X-ray detecting unit 112 may receive the X-rays emitted from the X-ray generating unit 111 or other radiation source. The X-rays from the X-ray generating unit 111 may traverse the object under examination, and then reach the X-ray detecting unit 112. After receiving the X-rays, the X-ray detecting unit 112 may generate the raw data of an X-ray image of the object under examination. The term "raw data" may refer to the data that may be detected by the X-ray detecting unit 112, and the data may be utilized to construct an X-ray image. The X-ray detecting unit 112 may receive X-rays and generate the raw data of an X-ray image of the object under examination. The X-ray detecting unit 112 may include an X-ray detector or other components. The shape of the X-ray detector may be flat, arc-shaped, circular, or the like, or any combination thereof. The fan angle of the arc-shaped detector may be an angle between 0° and 360°. The fan angle may be fixed or adjustable according to different conditions including, for example, the desired resolution of an image, the size of an image, the sensitivity of a detector, the stability of a detector, or the like, or any combination thereof. In some embodiments, the pixels of the detector may relate to the number of the smallest detecting units, e.g., the number of detector cells (e.g., scintillator or photosensor, etc.). The pixels of the detector may be arranged in a single row, two rows, or another number of rows. The X-ray detector may be one-dimensional, two-dimensional, or three-dimensional.

The control module 130 may control the radiation module 110, the image processing module 120, the storage module 140, or other units or devices in the system according to some embodiments of the present disclosure. The control module 130 may receive information from or send information to the radiation module 110, the image processing module 120, and/or the storage module 140. In some embodiments, the control module 130 may control the radiation module 110 to generate a certain voltage, and/or a certain current for the scanning of an object. Merely by way of example, the voltage and/or current may be different for examining people of different age, weight, height, or so forth. In some embodiments, the control module 130 may receive a command provided by a user including, for example, an imaging technician, a doctor, etc. Exemplary commands may relate to a scan time, a location of the object, the location of a couch on which the object lies, objection or a rotating speed of the gantry, a specific parameter relating to a threshold that may be used in the image reconstruction process, or the like, or any combination thereof. The control module 130 may control the image processing module 120 to select different algorithms to process the raw data of an X-ray image. The control module 130 may select a protocol among multiple protocols that are designed for various scan scenarios. The control module 130 may transmit some commands to the storage module 140 to retrieve images for display. Exemplary commands may include the size of an image, the portion of an object to be displayed, the duration of an X-ray image to be displayed on a display screen, etc. In some embodiments of the present disclosure, an X-ray image may be divided into several sub-portions for display. The control module 130 may control the division of the X-ray image. For example, the control module 130 may determine the number of sub-portions to be generated, the size of a sub-portion, the region to be covered in a sub-portion, or the like, or any combination thereof. It should be noted that the above description about the control module is merely an example according to the present disclosure.

The image processing module 120 may process different kinds of information received from different modules or units including the radiation module 110, the control module 130, the storage module 140, or other modules or units that may generate information relating to an image. The image processing module 120 may process the data from the radiation module 110 to generate an X-ray image of an object under examination. Image processing may be based on an algorithm including, for example, Fourier slice theorem, filtered back projection algorithm, fan-beam reconstruction, iterative reconstruction, or the like, or any combination thereof. The image processing module 120 may convert the information from the storage module 140 to a particular form that may be identified, understood, or executed by the control module 130, and it may process the information from the control module 130 to retrieve data from the storage module 140. The information from the control module 130 to the radiation module 110 may be processed by the image processing module 120 first so that it may be identified, understood, executed, or performed by the radiation module 110. The above description of the image processing module 120 is merely for exemplary purposes, should not be understood as the only embodiments, and these examples do not limit the scope of the present disclosure.

The storage module 140 may be configured or used to store information. The information may include programs, software, algorithms, data, text, number, images, voice, or the like, or any combination thereof. For example, a user or an operator may input some initial parameters or conditions to initiate a scan that may be stored in the storage module 140. Exemplary parameters or conditions may include the scan time, the location of the object for scanning, the rotating speed of the gantry, a mask relating to voxel calculation, or the like, or any combination thereof. As another example, some information may be imported from external resource, such as a floppy disk, a hard disk, a wireless terminal, or the like, or any combination thereof.

The storage module 140 may receive information from the control module 130 to adjust some parameters relating to display. Such parameters may include, but are not limited to the size of an image, the portion of an object whose image is to be displayed, the duration that an image remains on a display screen, the order that images or portions of an image are to be displayed, or the like, or a combination thereof. In respect to the display of the X-ray images, the whole or part of an X-ray image may be displayed. In some embodiments, an X-ray image may be divided into several sub-portions, which may be displayed on a screen at the same time or in a certain order. In some embodiments, different sub-portions may be displayed with different resolutions. According to some embodiments of the present disclosure, the user or the operator may select one or more sub-portions to display according to some conditions. Merely by way of example, the user may specify that an enlarged view of a sub-portion is to be displayed. Such information relating to display or other information may be provided by, for example, a user, real time when the information is to be used, or before the information is to be used and stored in, for example, in the storage module 140. It should be noted that the above description about the storage module 140 is merely an example according to some embodiments of the present disclosure.

It should be noted that the above description of the X-ray imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the X-ray imaging system 100 may be varied or changed according to specific implementation scenarios. Merely by way of example, some other components may be added into the X-ray imaging system 100, such as a patient positioning unit, a high-voltage tank, an amplifier unit, a storage unit, an analog-to-digital converter, a digital-to-analog converter, an interface circuit, or the like, or any combination thereof. The amplifier unit may amplify signals received by the X-ray detecting unit 112. Note that the X-ray imaging system may be a single-modality imaging system, or a multi-modality imaging system including, e.g., a positron emission tomography-computed tomography (PET-CT) system, a computed tomography-magnetic resonance imaging (CT-MM) system, a remote medical X-ray imaging system, etc. However, those variations and modifications do not depart from the scope of the present disclosure.

Figure 2:
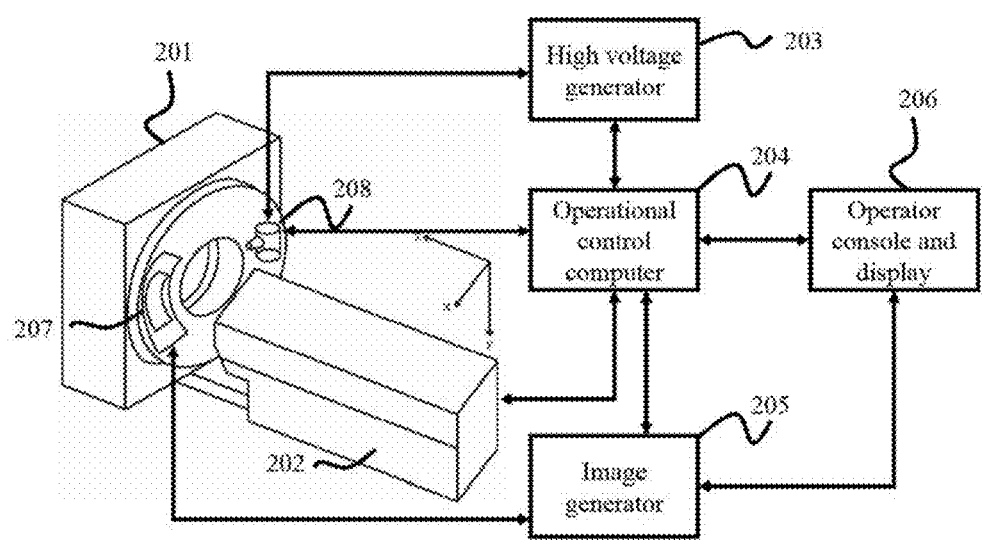
FIG. 2 is a block diagram of an X-ray imaging system according to some embodiments of the present disclosure.

FIG. 2 illustrates a block diagram of the X-ray imaging system 100 according to some embodiments of the present disclosure. As shown in the figure, the X-ray imaging system 100 may include a gantry 201, an object couch 202, a high voltage generator 203, an operational control computer 204, an image generator 205, and an operator console and display 206.

The gantry 201 may house the components needed or used to produce and detect X-rays to generate a CT image. The gantry 201 may include an X-ray tube 208 and a detector 207. It should be noted that in alternative embodiments of the present disclosure, the high voltage generator 203 may be located in the gantry 201. The X-ray tube 208 may emit radiation that may be received by the detector 207 after it passes through an object exposed in the aperture of the gantry 201. Merely by way of example, the radiation may include a particle ray, a photon ray, or the like, or any combination thereof. The particle ray may include a stream of neutrons, protons, electrons, μ-mesons, heavy ions, or the like, or any combination thereof. The photon beam may include an X-ray beam, a γ-ray beam, an α-ray beam, a β-ray beam, an ultraviolet beam, a laser beam, or the like, or any combination thereof. The object may include a substance, a tissue, an organ, an object, a specimen, a body, or the like, or any combination thereof. In some embodiments, the X-ray tube 208 may be a cold cathode ion tube, a high vacuum hot cathode tube, a rotating anode tube, etc. The shape of the X-ray beam emitted by the X-ray tube 208 may be a line, a narrow pencil, a narrow fan, a fan, a cone, a wedge, an irregular shape, or the like, or any combination thereof. The shape of the detector 207 may be flat, arc-shaped, circular, or the like, or any combination thereof. The fan angle of the arc-shaped detector may be an angle from 0° to 360°. The fan angle may be fixed or adjustable according to different conditions including, for example, the desired resolution of an image, the size of an image, the sensitivity of a detector, the stability of a detector, or the like, or any combination thereof. In some embodiments, the pixels of the detector 207 may be the number of the smallest detecting units, e.g., the number of detector cells (e.g., scintillator or photosensor, etc.). The pixels of the detector may be arranged in a single row, two rows, or another number of rows. The X-ray detector may be one-dimensional, two-dimensional, or three-dimensional.

The high voltage generator 203 may produce high voltage, and apply it to the X-ray tube 208. The voltage generated by the high voltage generator 203 may range from 80 kV to 140 kV, or from 120 kV to 140 kV. The current generated by the high voltage generator may range from 20 mA to 500 mA. In alternative embodiments of the present disclosure, the voltage generated by the high voltage generator 203 may range from 0 to 75 kV, or from 75 to 150 kV.

The operational control computer 204 may communicate bidirectionally with the gantry 201, the tube 208, the high voltage generator 203, the object couch 202, the image generator 205, and/or the operator console display 204. Merely by way of example, the gantry 201 may be controlled by the operational control computer 204 to rotate to a desired position that may be prescribed by a user via the operator console and display 206. The operational control computer 204 may perform at least some of the functions of the control module 130. For instance, the operational control computer 204 may control the generation of radiation, the image processing, etc. The operational control computer 204 may also take control of other parameters. For example, the operational control computer 204 may control the generation of the high voltage generator 203, for example, the magnitude of the voltage and/or the current generated by the high voltage generator 203. As another example, the operational control computer 204 may control the display of images on the operator console and display 206. For instance, the whole or part of an image may be displayed. In some embodiments, an image may be divided into several sub-portions, which may be displayed on a screen at the same time or in a certain order. According to some embodiments of the present disclosure, the user or the operator may select one or more sub-portions to display according to some conditions. Merely by way of example, the user may specify that an enlarged view of a sub-portion is to be displayed.

The operator console and display 206 may allow a user to input information to the system 100. The operator console and display 206 may include, for example, an integral keyboard, a touchscreen with "soft" buttons for communicating commands and information to the system 100, etc. The operator console and display 206 may alternatively include a microphone by which a user may provide oral commands to the system 100 to be "translated" by a speech recognition program or otherwise. The operator console and display 206 may otherwise include any other like device to provide or achieve user interface of, and data exchange with, the system 100. For instance, a user may make inputs via the operator console and display 206 to turn on the system 100, or one or more processors, modules, units, thereby initiating an image reconstruction process.

The operator console and display 206 may be coupled with the operational control computer 204 and the image generator 205. In some embodiments, the operator console and display 206 may display images generated by the image generator 205. In some embodiments, the operator console and display 206 may send a command to the image generator 205, and/or the operational control computer 204. More description regarding the function of the image generator may be found in, for example, the processing module 305 in FIG. 3. In some embodiments of the present disclosure, the operator console and display 206 may acquire parameters for a scan. The parameters may include acquisition parameters and/or reconstruction parameters. Merely by way of example, the acquisition parameters may include tube potential, tube current, a recon parameter (e.g., slice thickness), scan time, collimation/slice width, beam filtration, helical pitch, or the like, or any combination thereof. The reconstruction parameters may include reconstruction field of view, reconstruction matrix, convolution kernel/reconstruction filter, or the like, or any combination thereof.

The object couch 202 may support a patient and move the patient through the aperture of the gantry 201 during an examination. As shown in FIG. 2, the direction of a patient being transmitted during an examination is along the z direction. Depending on the region of interest (ROI) selected in the patient or the protocols selected, the patient may be positioned supine or prone, and either feet or head first. In some embodiments of the present disclosure, the object couch 202 may be indexed between multiple scans. In some embodiments of the present disclosure, the object couch 202 may be translated through the gantry 201 at a constant speed. The speed may relate to the length of the area to be scanned, the total scan time, or the like, or any combination thereof. In some embodiments, the object couch 202 may be used to support an object, e.g., a patient. Such a structure may move the object for examination through the X-ray imaging system.

It should be noted that the description of the X-ray imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, the gantry 201 may further include a microphone, sagittal laser alignment light, patient guide lights, X-ray exposure indicator light, energy stop buttons, gantry control panels, external laser alignment lights, etc.

Figure 3:
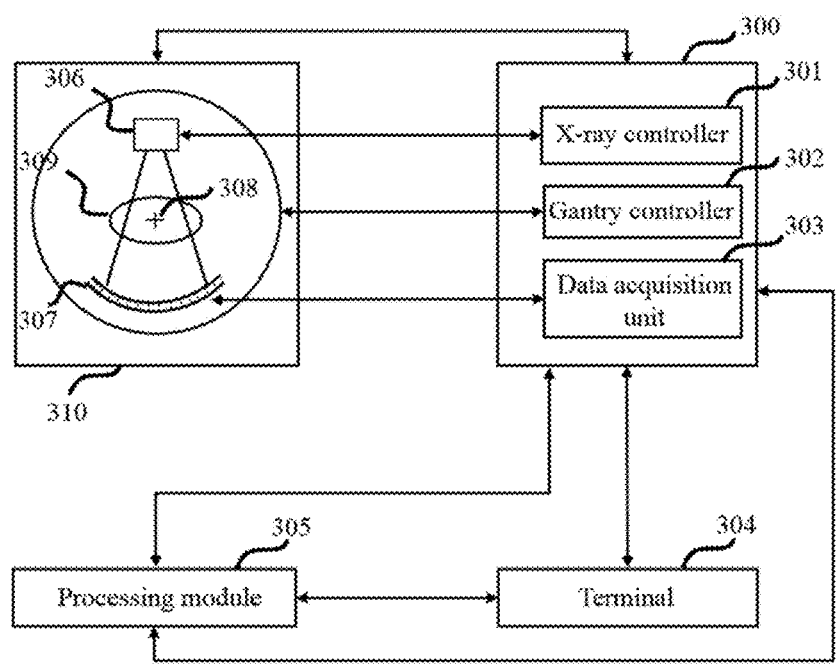
FIG. 3 is an exemplary schematic diagram of the imaging system according to some embodiments of the present disclosure.

FIG. 3 is an exemplary schematic diagram of the CT scanning system according to some embodiments of the present disclosure. The system may include an operation controller 300, a terminal 304, and a processing module 305. During a scanning, an X-ray source 306 and a detector 307 may rotate about a center axis 308. Beams of the X-ray source may be received by multiple detector cells located at various locations on the detector 307. A detector cell may generate an electrical signal corresponding to, for example, the intensity of an impinging X-ray beam. The intensity of an X-ray beam passing through an object (e.g., a patient) that lies between the X-ray source 306 and the detector 307 may be attenuated, and may be evaluated based on the X-ray beam impinging on the detector 307. As shown in FIG. 3, rotation of the gantry 310 and the components mounted thereon, the operation of the X-ray source 306, and the operation of the detector 307 may be governed by the operation controller 300. The operation controller 300 may include an X-ray controller 301, a gantry controller 302, and/or a data acquisition unit 303. In some embodiments, the operation controller may perform some functions of the control module 130 which may take control of, for example, data acquisition, image reconstruction, or the like, or a combination thereof.

The X-ray controller 301 may provide power and timing signals to the X-ray source 306. In some embodiments, the X-ray source 306 may include more than one focal point, in which case the radiation received by the detector 307 may come from different focal spots that a number of beam paths are produced during scanning. Thus, the one or more focal spots generating the X-ray may be controlled by the X-ray controller 301 under certain conditions in the scanning. In some embodiments, the radiation source may have a fixed focal spot. The rotational speed and position of the gantry 310 may be controlled by the gantry controller 302.

In some embodiments, the detector 307 may be formed by a plurality of detector cells and a data acquisition system. The plurality of detector cells may sense the projected X-rays that pass through a subject, and the data acquisition system may convert the data to digital or analog signals for subsequent processing. A detector cell may produce a signal that may represent the intensity of an X-ray beam impinging on the detector cell. If an X-ray beam passes through the subject before reaching the detector cell, the intensity of the impinging X-ray beam may be attenuated. The process of data acquisition may be controlled by a data acquisition unit 303.

The terminal 304 may be capable to display information relating to the object scanned in the radiation imaging system. For example, a reconstructed image of the portion scanned may be displayed. In some embodiments, the terminal 304 may be capable of receiving input or operational instructions from a user including, for example, an imaging technician, a doctor, etc. Merely by way of example, the position of a couch may be adjusted following an input from the terminal 304. Exemplary input information may include a scan time, the rotating speed of the gantry, a specific parameter relating to a threshold that may be used in the image reconstruction process, or the like, or a combination thereof. The processing module 305 may process the scan data acquired by the data acquisition unit in cooperation with, for example, a system default setting, instructions received from a terminal 304, or any other information source relating to the imaging system. For example, the processing module 305 may retrieve the information relating to the position of the couch, the radiation source, and/or the detector. As another example, the processing module 305 may retrieve an image reconstruction model or instructions for conducting an iterative reconstruction of an image, from a local storage device integrated in the system (not shown in FIG. 3), or from a remote server or a cloud storage. The processing module 305 may include at least one processor or microprocessor that may interpret and/or execute instructions and process outgoing and incoming signals via the communication links between, for example, the operation controller 300 and the terminal 304.

It should be noted that the description of the CT scanning system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, the effect of the X-ray controller 301, the gantry controller 302, and/or the data acquisition unit 303 may be achieved by a single integrated circuit. Additionally, the controllers may communicate with each other through a wired connection, or the communication may also be realized in a wireless way.

Figure 4:
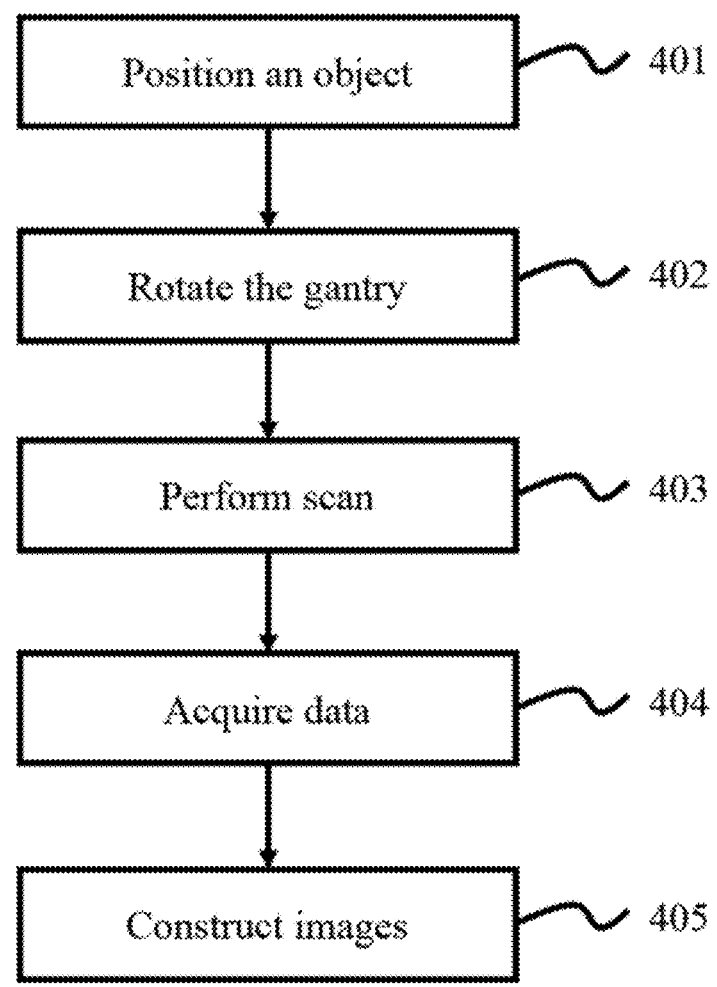
FIG. 4 is a flowchart illustrating a process for image reconstruction according to some embodiments of the present disclosure.

FIG. 4 illustrates a process of image reconstruction by the radiation imaging system according to some embodiments of the present disclosure. In step 401, an object may be positioned in the radiation (e.g., X-ray) imaging system 100, specifically, on the object couch 202 that is described elsewhere in the present disclosure.

After the object is positioned, the gantry of the radiation imaging system 100 may be rotated to a desired position in step 402. In step 403, a scan may be performed on the object. In some embodiments of the present disclosure, a number of protocols may be created for scanning different objects. Multiple parameters may be determined by the protocols. Merely by way of example, the parameters may be with respect to a collimator aperture, a detector aperture, an X-ray tube voltage and/or current, a scan mode, a table index speed, a gantry speed, a reconstruction field of view (FOV), kernel, or the like, or any combination thereof.

By way of the scan, the raw data corresponding to the object may be acquired in step 404. After the raw data is acquired, the images of the object may be constructed in step 405. Merely by way of example, the reconstruction of the images may be based on methods including Fourier slice theorem, filtered back projection algorithm, fan-beam reconstruction, iterative reconstruction, or the like, or a combination thereof.

Figure 5:
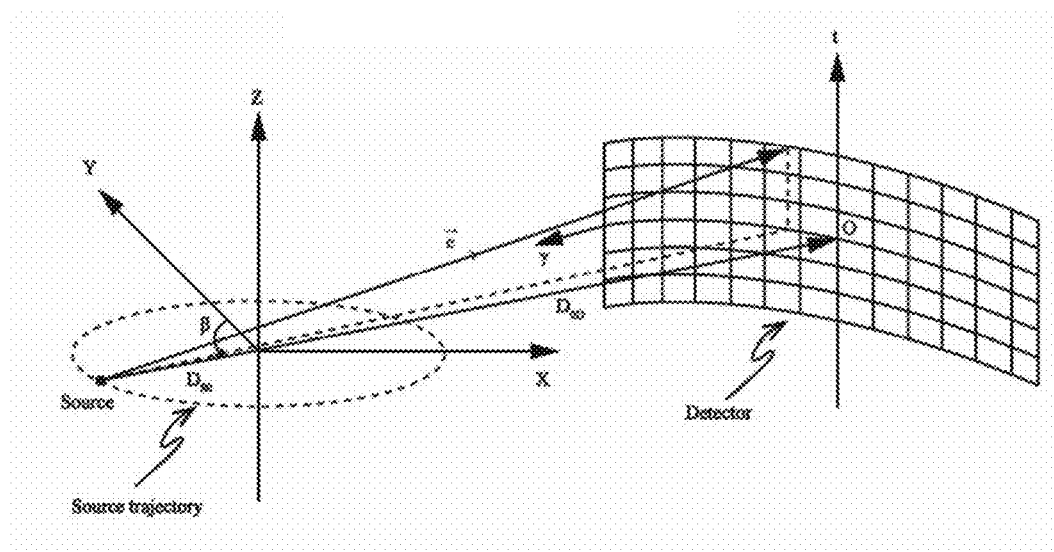
FIG. 5 is a diagram illustrating an exemplary axial cone-beam curved-detector geometry according to some embodiments of the present disclosure.

As described elsewhere in the disclosure, image reconstruction may have to take into account the geometry of the imaging system. The forward/backward projections in statistical model based image reconstruction may be based on different kinds of beam geometries and aim at revealing geometric and physics reality of the imaging system. Exemplary beam geometries may include, but not limited to, a cone beam geometry, a parallel beam geometry, a fan beam geometry, or the like, or a combination thereof. The geometry used to perform the image reconstruction may be two-dimensional (2D) or three-dimensional (3D). For simplicity, an exemplary cone beam geometry is illustrated in FIG. 5 according to some embodiments of the present disclosures, where an image coordinate system of a reconstruction platform is also used. The X-ray source may be located on points on a circle of radius $D_{s0}$ centered at $\vec{o}$ on the z=0 plane. $D_{s0}$ may denote the distance between the source $\vec{p}_0$ and the rotation center $\vec{o}$. $D_{OD}$ may denote the distance between the rotation center $\vec{o}$ and the origin of a local coordinate of the detector. The letter $\gamma$ in FIG. 5 may denote a detector channel-direction local coordinate defined by an angle and whose coordinate axis is located in the $\gamma$-axis. The letter t may denote a detector slice-direction local coordinate defined by a length and whose coordinate axis is located in the t-axis. The vector $\vec{e}$ in FIG. 5 may denote a radiation ray from the source to the detector.

The forward projection may be defined as:

$$\text{Proj}(\gamma_k, t_l, \beta) = \Sigma_{(x,y,z)} \alpha(\gamma_k, t_l, \beta, \vec{n}) f(\vec{n}) \tag{1}$$

where Proj($\gamma,t,\beta$) may denote a line integral of the attenuation coefficients along the path connecting the source and the detector coordinate ($\gamma,t$), $\beta$ may denote the angle of the source point counter-clockwise from the y axis (when the view is from the positive direction of the z-axis), $f(\vec{n})$ may denote a 2D or 3D image voxel value, and $\vec{n}$ may be located in the voxel center coordinate (x,y,z) whose coordinate (0,0,0) may be located at $\vec{o}$, $\alpha(\gamma_k,t_l,\beta,\vec{n})$ may denote the voxel contribution factor (e.g., a footprint function), and ($\gamma_k,t_l$) may denote the center of a detector cell specified by indices (k,l).

The backward projection may be defined as:

$$f(\vec{n}) = \Sigma_{(\gamma_k,t_l,\beta)} \alpha(\gamma_k,t_l,\beta,\vec{n}) \text{Proj}(\gamma_k,t_l,\beta), \quad (2)$$

where the contribution factor $\alpha(\gamma_k,t_l,\beta,\vec{n})$ (or the adjoint thereof) may denote a projection operator that may represent the contribution of $f(\vec{n})$ forward projected to Proj($\gamma,t,\beta$) or the contribution of Proj($\gamma,t,\beta$) backward projected to $f(\vec{n})$ at an angle $\beta$. The contribution factor $\alpha(\gamma_k,t_l,\beta,\vec{n})$ (or the adjoint thereof) may be defined as:

$$\alpha(\gamma_k,t_l,\beta,\vec{n}) = l(\gamma_k,t_l,\beta;\vec{n}) F(\gamma_k,t_l,\beta,\vec{n}), \quad (3)$$

where $F(\gamma_k,t_l,\beta,\vec{n})$ may denote a 2D function with a unit amplitude and represent the voxel shadow casting on the detector ($\gamma_k,t_l$), and $l(\gamma_k,t_l,\beta;\vec{n})$ may denote the amplitude of $F(\gamma_k,t_l,\beta,\vec{n})$ and represent the casting ray length through the voxel. The casting ray direction may be determined by the ray connecting the source $\vec{p}_0$ and $\vec{n}$.

Approximately, the footprint shadow may be separated into two independent directions:

$$F(\gamma_k,t_l,\beta,\vec{n}) = F_1(\gamma_k,\beta,\vec{n}) F_2(t_l,\beta,\vec{n}) \quad (4)$$

where $F_1(\gamma_k,\beta,\vec{n})$ may denote the footprint shadow along the detector channel-direction, and $F_2(t_l,\beta,\vec{n})$ may denote the footprint shadow along the detector slice-direction.

In the practice of iterative image reconstruction, an image may be transformed from an image domain into data in a projection domain by forward projection, and be transformed from the data in the projection domain into the image domain by backward projection. In a backward projection, as shown in Equation (2), the image may be determined by both the contribution factor $\alpha(\gamma_k,t_l,\beta,\vec{n})$ and a line integral Proj($\gamma_k,t_l,\beta$) of the attenuation coefficients.

Figure 6:
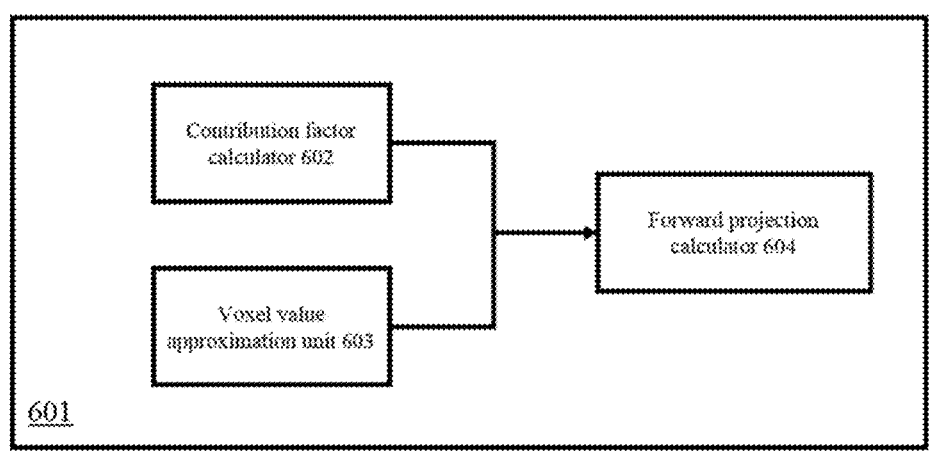
FIG. 6 is a block diagram of a forward projection block according to some embodiments of the present disclosure.

In a forward projection, as shown in Equation (1), the projected data may be determined by both the contribution factor $\alpha(\gamma_k,t_l,\beta,\vec{n})$ and the image voxel value $f(\vec{n})$. As shown in FIG. 6, an exemplary block diagram of a forward projection block is depicted according to some embodiments of the disclosure. A forward projection block 601 may include a contribution factor calculator 602, a voxel value approximation unit 603, and a forward projection calculator 604. The contribution factor calculator 602 may calculate a contribution factor of a voxel. The voxel value approximation unit 603 may calculate a voxel value. The forward projection calculator 604 may receive the contribution factor and the voxel value and conduct the projection based on an algorithm (e.g., as described in Equation (1)). The contribution factor calculator 602 and the voxel value approximation unit 603 may calculate the contribution factor and the voxel value of a voxel, or a sub-voxel divided from a voxel based on, for example, the footprint shadow range of the voxel. Details regarding the division of the voxels may be found elsewhere in the present disclosure. See, for example, FIG. 9 and the description thereof.

In some embodiments, the contribution factor may be determined by the geometric relationship between the radiation source (e.g., an X-ray source), the object, and the detector. In one example, the contribution factor may be determined by the relative locations of the radiation source, the object, and the detector. In another example, the configuration of a voxel may have an influence on the contribution factor. As used herein, the configuration of a voxel may include, but not limit to, the geometric model of a voxel (e.g., a cuboid model, a polar grids model, a wavelet model, an overlapping circles or spheres model, a disk model, a polygon model, etc.), the size of a voxel (e.g., the dimensions along the x axis and the y axis, the thickness along the z direction, etc.).

In some embodiments, the voxel value may include information relating to, e.g., the gray scale of a voxel, the RGB level of a voxel, the brightness of a voxel, or the like, or a combination thereof. Moreover, the distribution of the voxel values in the image may be configured in different manners. For example, the distribution of the voxel values may be configured as discretized, meaning that the voxel values of two neighboring voxels are not continuous. In another example, the distribution of the voxel value may be configured as continuous, meaning that the voxel values of neighboring voxels are continuous. In another example, the distribution of the voxel values may be configured as partially discretized and partially continuous, meaning that the voxel values of at least some voxels in one condition are continuous and the voxel values of at least some voxels in another condition are discretized. Merely by way of example, the voxel values of two neighboring voxels in the x-y plane may be discretized, and the voxel values of two neighboring voxels along the z direction may be continuous. In another example, the voxel values of two neighboring voxels in the x-y plane may be continuous, and the voxel values of two neighboring voxels along the z direction may be discretized. In still another example, the voxel values of two neighboring voxels along the z direction within one range of the z coordinate may be discretized, and the voxel values of two neighboring voxels along the z direction within another range of the z coordinate may be continuous. Descriptions regarding methods and systems for configuration of the voxel values may be found in, e.g., International Patent Application No. PCT/CN2015/097121 filed on Dec. 11, 2015, which is hereby incorporated by reference.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, the forward projection block 601 may include at least one unit that may generate information relating to some physical effects. Examples of such physical effects may be a polychromatic x-ray spectrum, a finite detector point-spread function, a finite focal spot size, azimuthal blur, scattered radiation, measurement noise, or off-focal radiation, or the like, or a combination thereof.

Figure 7:
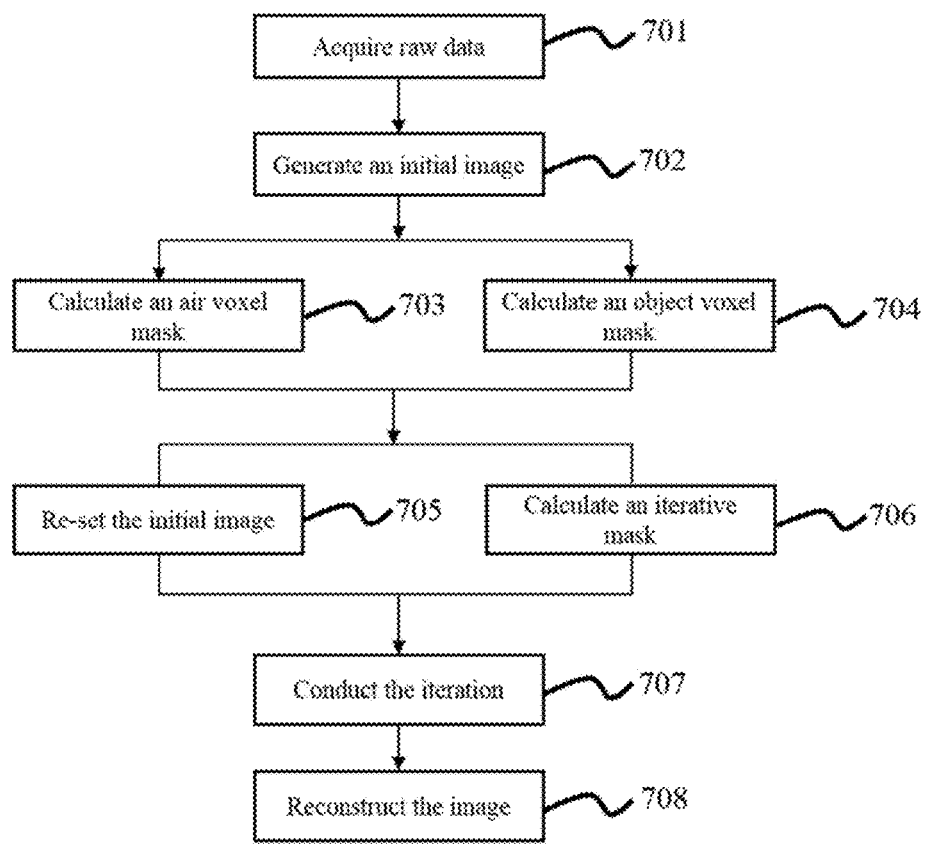
FIG. 7 is a flowchart illustrating a process for accelerating the image reconstruction according to some embodiments of the present disclosure.

FIG. 7 illustrates an exemplary flowchart of image reconstruction according to some embodiments of the disclosure. In step 701, raw data may be acquired at a detector including one or more detector cells by collecting radiation (e.g., X-ray) beams impinging on the detector. Some radiation may pass through an object before impinging on the detector. Then, an initial image may be generated based on the raw data in step 702. Merely by way of example, the initial image may be constructed based on a plurality of methods including Fourier slice theorem, filtered back projection algorithm, fan-beam reconstruction, or the like, or a combination thereof. In step 703, an air voxel mask may be calculated. As used herein, the air voxel mask may relate to identifying voxels located in or representing air in an object, or a portion thereof, being scanned. During image processing, one or more regions, such as regions located in the gut with some air, or any other portions containing a certain amount of air, may be treated differently in a same operation or in different operations from those regions of interest. In some embodiments, the air voxel mask may be used to mark the voxels located in or representing air in a manner different from one or more voxels of interest. During the subsequent processing, the voxels marked as "air," or any designated sign, may be omitting or not processed, or may be processed differently from the voxels of interest. For instance, the voxels marked as "air" may be omitted or not calculated during the forward projection and/or backward projection, or omitted or not iteratively calculated during the iterative reconstruction. As used herein, the voxels of interest may refer to the voxels building up a region of interest in an image. Exemplary regions of interest may include a tissue, an organ, a specimen, a body of a patient or a part thereof, or the like, or a combination thereof.

In step 704, an object voxel mask may be calculated. Similarly, the object voxel mask may be used to identify a specific voxel that is different from a voxel of interest. For example, an object voxel mask may be used to identify a certain kind of a prior object. As used herein, a prior object may refer to a pre-existing object other than an object to be examined (e.g., a patient). Examples of such prior objects may include the couch, or any other apparatuses or components of the imaging system that may be scanned along with a region of interest during the scanning. In some embodiments, the object voxel mask may mark a certain prior object in a manner different from the voxels of interest. During subsequent processing, the prior object may be omitted or not processed, or may be processed differently from the voxels of interest. In some embodiments, more than one object voxel mask may be generated. The object voxel masks may be based on different kinds of prior objects. The object voxel masks or a part thereof may be used to mark the prior objects for subsequent processing.

It shall be noted that the generation of the air voxel mask and/or the objection voxel mask may not be necessary, and the sequence of generating the air voxel mask and the object voxel mask may not be unique. In one example, the air voxel mask and the object voxel mask may be generated simultaneously after the acquisition of the initial image. In another example, the object voxel mask may be generated prior to the generation of the air voxel mask. In still another example, the object voxel mask may be generated prior to the acquisition of the initial image, based on the parameters relating to the prior objects (e.g., the location of the couch, the voxel value relating to the couch, etc.). As described elsewhere in the disclosure, the parameters relating to the prior objects may be acquired based on a system design and the geometry of the imaging system. For instance, as part of the system design, various voxel configurations and/or other scan parameters may be provided for selection by a user; an object voxel mask corresponding to various voxel selections and/or other scan parameters may be provided; when a user select a voxel configuration and/or one or more other scan parameters, one or more corresponding object voxel masks may be automatically selected or provided to the user for selection or for informational purposes.

In step 705, a re-set initial image may be acquired based on the air voxel, and/or the object voxel mask. In some embodiments, voxels in different portions of the image may be marked with different signs, according to which the voxels may be treated differently in subsequent processing. For instance, a voxel marked as less important or previously known may be omitted or not calculated in the forward projection and/or the backward projection of an iterative reconstruction.

In step 706, an iterative mask may be calculated based on the air voxel mask and/or the object voxel mask. In some embodiments, the iterative mask may be acquired by merging various kinds of the object voxel masks with an assigned object marker. During the forward projection and/or the backward projection of the iterative calculation, some voxels may be treated as prior knowledge based on the assigned object marker. In one example, an "air" voxel is omitted or not calculated during the forward projection and/or the backward projection. In another example, a prior object voxel is omitted or not calculated during the backward projection because the prior object voxel may be assigned, for example, an exact value such that the contributions of the prior object voxel in the backward projection may be zero. In still another example, the forward projection contribution factor $\alpha(\gamma_k, t_l, \beta, \vec{n})$ of a prior object voxel for a radiation ray or radiation beam in a view angle (or each view angle) may be pre-calculated and/or iteratively used in the image processing. The pre-calculated forward projection contributions of various prior object voxels may be stored in a storage for future use, along with corresponding parameters relating to, for example, system configurations. Exemplary system configurations may include beam geometries, the geometric relationship between the radiation source (e.g., an X-ray source), the couch, the object, and the detector, or the like, or a combination thereof.

In step 707 and step 708, the iterative reconstruction may be conducted to generate a reconstruction image of the object. Details regarding to the iteration may be found elsewhere in the present disclosure. See, for example, FIG. 13 and the description thereof.

It should be noted that the above description of the image reconstruction process is merely provided for the purposes of illustration, and not intended to limit the scope of the present disclosure. For persons having ordinary skills in the art, multiple variations and modifications may be made under the teachings of the present disclosure. For example, re-setting the initial image in step 705 may be unnecessary. Alternatively, the re-setting may be performed during the iterative process. In some embodiments, the iterative mask used in one iterative step may be different from that of another iterative step. For example, the usage of the iterative mask may be determined by the image obtained from a prior iteration. In some embodiments, the acquisition of the air voxel mask, the object voxel mask, and/or the iterative mask may be based on a database storing a plurality of masks along with the conditions under which the corresponding masks may be retrieved or used.

Figure 8:
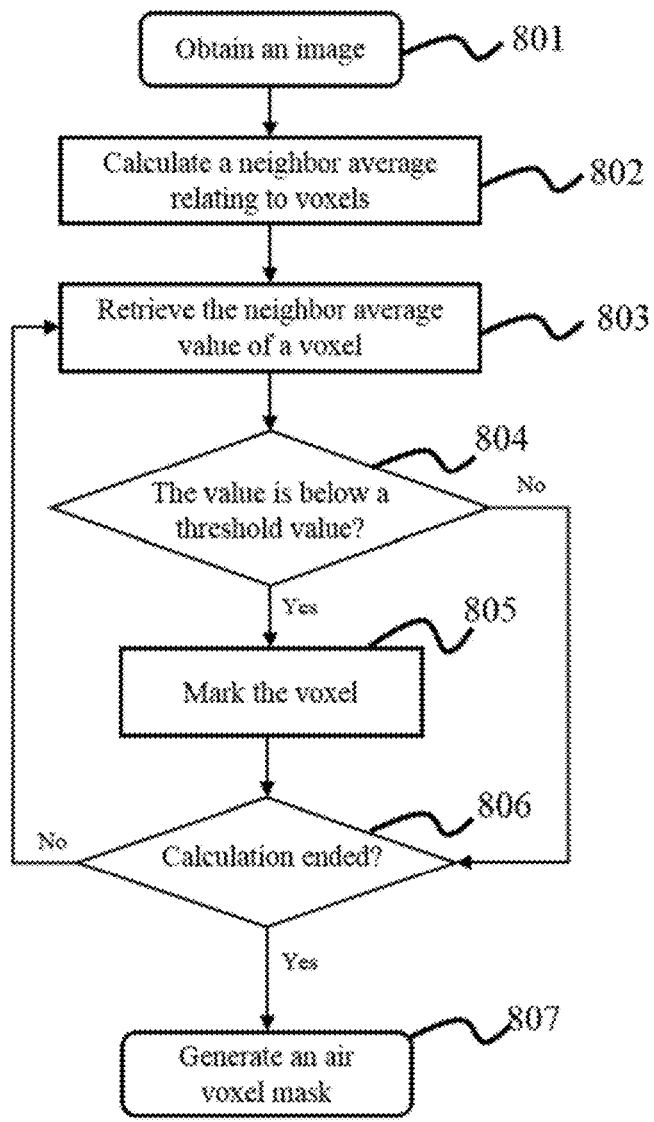
FIG. 8 is a flowchart illustrating a process for generating an air voxel mask according to some embodiments of the disclosure.

FIG. 8 is a flowchart illustrating a process for generating an air voxel mask according to some embodiments of the disclosure. In step 801, an image may be obtained. The image may be initially generated based on the raw data generated, for example, by a CT scan, or from other resources (e.g., a computer-simulated scan). In some embodiments, the initial image may be generated according to a reconstruction algorithm. Examples of such reconstruction algorithms may include those based on Feldkamp-Davis-Kress (FDK) reconstruction, maximum a posteriori probability (MAP), maximum likelihood (ML), algebraic reconstruction technique (ART), entropy-based optimization, least squares (LS) or penalized weighted least squares (PWLS), filtered backward projection (FBP), or the like, or a combination thereof. The described algorithms may be executed once, or may be executed iteratively. In some embodiments, the initial image may be constructed based on a part of the raw data. In some embodiments, the initial image may also be appropriately set by default. For instance, the initial image may be an outline of the object set by a user including, for example, an imaging technician, a doctor, etc.

In step 802, a local average value relating to voxels in the image obtained in step 801 may be calculated. As used herein, a local average value relating to a voxel may be a value characterized by one or more neighbor voxels. For example, the local average value relating to a specific voxel may be the average value of the voxel values of all neighbor voxels including or not including the voxel value of the specific voxel.

The neighbor voxels may be a number of voxels surrounding or next to a specific voxel. The number may be two, or four, or six, or nine, or any positive integer. In some embodiments, the neighbor voxels may be the closest voxels located next to the specific voxel. For example, in the case that the specific voxel is a cubic (or cuboidal) voxel including six square (or rectangular) faces, the neighbor voxels may be one or more voxels next to one or more of the six faces of the cubic (or cuboidal) voxel. In some embodiments, the surrounding neighbor voxels may be located within a distance from the specific voxel. The distance may relate to the dimension of the specific voxel, e.g., the side length in the case of a cubic voxel, the radius in the case of a spherical voxel, etc. In one example, when the shape of the specific voxel is rectangular (e.g., in the x-y plane), the distance may be set as multiple times of the side length. In another example, the neighbor voxels may include the voxels in the circle that is next to and surrounds the specific voxel, or the voxels in one or more outer circles that surround the first voxel, or the like, or a combination thereof.

In some embodiments, the number of the neighbor voxels may remain the same during the process, or may change during the process. In some embodiments, a greater number of the neighbor voxels being taken into account may achieve a more accurate result in the recognition of, for example, air voxels. In some embodiments, the number of the neighbor voxels being taken into account may change based on the object being scanned. For example, a first kind of object that is recorded in significance may be processed by assigning more numbers of neighbor voxels in determining the local voxel value than a second kind of object which is recorded with in less significance. The significance of an object may be recorded or stored in a data base connected to the system 100. The data base may be a local storage device (e.g., the storage module 140) or a remote storage device (e.g., a cloud server).

It should be noted that, the arrangement of the neighbor voxels described above are merely provided for illustrating examples of how to select the neighbor voxels, and not intended to limit the scope of the present disclosure. After the neighbor voxels of a specific voxel are identified, an average value of the neighbor voxels, referred to as a local average value, may be calculated according to the voxel values of some or all neighbor voxels. The average value relating to the specific voxel may be further used for determining the identification of the specific voxel.

After the calculation of the local average values relating to various voxels in the image, a retrieval may proceed in step 803. The retrieval may start from the first voxel of the image, to the last one of the image, or from the center of the image to the edge area, or from the interested area to the insignificant area, or the like, or any combination thereof.

A determination may be performed in step 804. The local average value of a voxel may be compared with a threshold to determine whether a voxel is, for example, an air voxel. A voxel with its local average value below the threshold may be considered as an air voxel. In some embodiments, the threshold may be set by default based on previous operations or experience. In some other embodiments, the threshold may be set according to the calculated local average values dynamically. For example, the threshold may be set based on the distribution of the local average values of voxels in the image. Specifically, the threshold may be set that a percentage of the whole number of voxels may be classified as air voxels, and the percentage may be, for example, 0.5%, or 1%, or 2%, or another value between 0 and 1.

After the determination, if the local average value is below the threshold, the voxel may be marked. In some embodiments, the voxel may be regarded as an air voxel if the local average value thereof is below the threshold. For illustrative purposes, the marking may be conducted as follows. At first, all the voxels of the image may be initialized in a same condition. The exemplary initialization process may include assigning a first number to the voxels, or assigning a first graphical symbol to the voxels, or the like, or a combination thereof. When a voxel is marked, the voxel may be assigned a second number, or a second graphical symbol, or the like, or a combination thereof.

In step 806, an assessment may be performed to determine whether the identification is completed. If another voxel needs to be processed, the process may proceed back to step 803. If the identification is completed based on a stopping condition, it may proceed to step 807. The stopping condition may be that all the voxels of the image are retrieved and assessed.

After all the voxels are processed, an air voxel mask may be generated in step 807. The mask may classify the voxels into different categories (also referred to as sets). One exemplary category may represent that the voxels marked do not need to be processed during the forward projection and/or the backward projection. Further, the mask may be modified due to, for example, the lack of the reliability of the previous judgment. In some embodiments, an eroding operation may be used to reshape the scale of the air voxels, based on which the area relating to air voxels may be adjusted. Merely by way of example, if the initial image subject to step 801 is inaccurate with respect to one or more parameters (e.g., boundary, position, etc.) of the object, some voxels may be marked as air voxels by mistake. As used herein, the eroding operation may refer to a process for adapting or revising the scale where one or more air voxels are marked. For example, the scale may be reduced so that fewer air voxels are enclosed in the scale.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, the calculation of local average value of a voxel may proceed after retrieving a voxel of the initial image.

Figure 9:
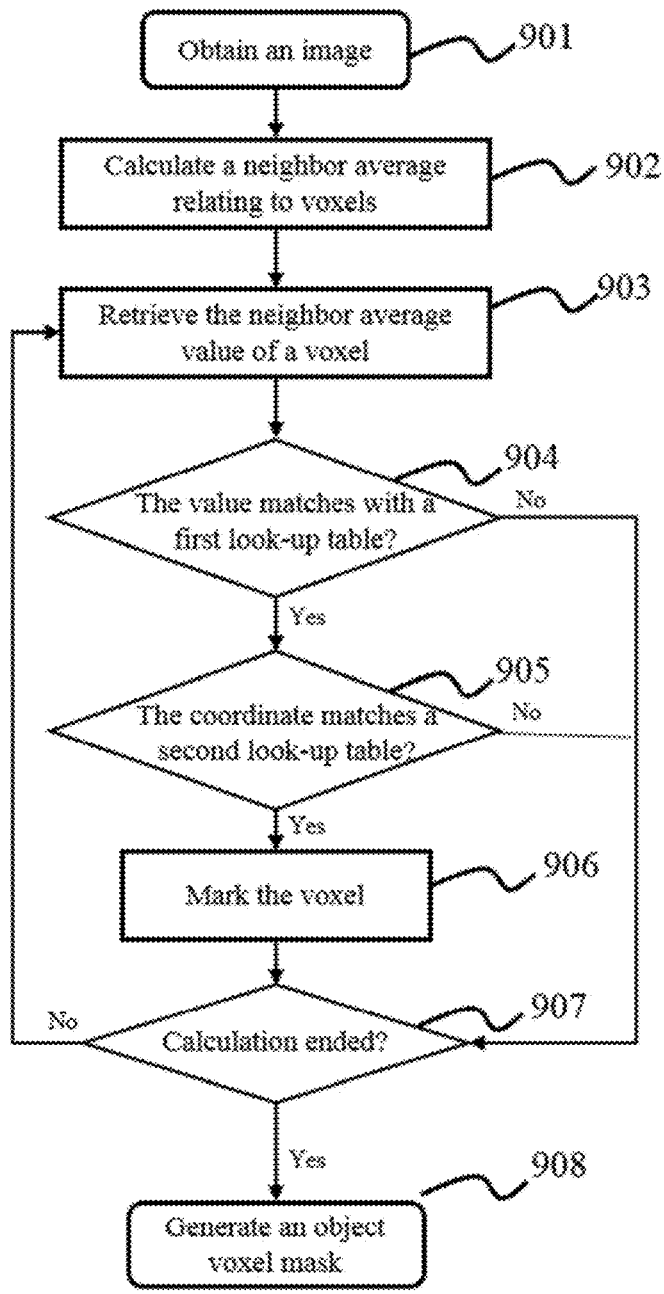
FIG. 9 is a flowchart illustrating a process for generating an object voxel mask according to some embodiments of the disclosure.

As described above, the air voxel mask may be used in the image reconstruction process to reduce the voxel numbers aimed to be calculated during the forward/backward projection. Besides, a mask relating to prior objects may also be constructed to facilitate the image reconstruction. As used herein, the prior objects may refer to objects that exist before a scanning is performed and scanned by the radiation ray during the scanning. Examples of such prior objects may include, the couch, or any other apparatus that may stay between the radiation source and the detector. FIG. 9 is a flowchart illustrating a process for generating an object voxel mask. In step 901, an image may be obtained. The image may be generated based on the methods described elsewhere in the disclosure.

In step 902, a local average value relating to a voxel obtained in step 901 may be calculated, and the local average value of a voxel may be retrieved in step 903 for subsequent processing. Details regarding the calculation of local average values may be found elsewhere in the present disclosure. See, for example, FIG. 8 and the description thereof.

In step 904, a first judgment may be conducted according to a first look-up table. Specifically, the value relating to a voxel, e.g., the local average value of the voxel, may be compared with reference values in the first look-up table. If the value matches a reference value in the first look-up table, it may proceed to step 905. If the value does not match a reference value in the first look-up table, it may proceed to step 907. The first look-up-table may be a database that store a prior object voxel value range. In some embodiments, the database may be set by default. For example, the data may be input by a user including, for example, an imaging technician, a doctor, etc., before a clinical scanning, or before the CT system put into use. In some embodiments, the database may be connected to or stored in a server, for example, a cloud server. Merely by way of example, a CT system may communicate with or access a cloud server. The database stored in the cloud server may be downloaded. The communication with or access to a database or a server may be controlled using an access privilege. The access privilege may be tiered. Merely by way of example, three tiers of access privileges may be provided. A first tier may include a full access privilege regarding information relating to a patient or an object, allowing both receiving and updating information relating to a patient or an object. A second tier may include a partial access privilege regarding information relating to a patient or an object, allowing receiving and updating part of information relating to a patient or an object. A third tier may include a minimal access privilege regarding information relating to a patient or an object, allowing receiving some information relating to a patient or an object, but no privilege to update any information relating to the patient or the object. Different login credentials may be associated with different access privilege to the information relating to a subject in the system. As used herein, updating may include providing information that does not exist in the database or the server, or modifying pre-existing information with new information. The database may be pre-constructed based on the design parameters of a certain CT system. The exemplary parameters may include material, configuration, geometry size, or the like, or a combination thereof. For example, the database may include information of the local average value range of a voxel located in the couch area.

A further judgment may be conducted in step 905 according to a second look-up table. Specifically, the location of a voxel may be compared with the second look-up table. If the location of the voxel matches with the second look-up table, it may proceed to step 906. If the location of the voxel does not match with the second look-up table, it may proceed to step 907. The second look-up-table may be a database that stores the locations of the voxels located in a prior object. In some embodiments, the database may store the coordinates of the prior object region relative to a point of the system including, for example, the center of the system. Once given a system center coordinate, the coordinates of all the voxels located in a prior object may be generated according to the second look-up table based on the design of the system (for example, a certain CT system). Because of the movement of the couch, the location of the voxels located in or corresponding to a prior object may be provided cooperatively with the operation of the prior object. Put another way, the location of the voxel may be compared with the second look-up table under the same condition of the prior object. If the coordinate of a voxel matches the second look-up-table, the voxel may be considered as a voxel located in the prior object.

After the two judgements, the voxels identified as voxels located in the prior object may be marked in step 906. For illustrative purpose, the marking may be conducted in the following ways. At first, all the voxels of the image may be initialized based on a same condition. The exemplary initialization process may include assigning a first number to the voxels, or assigning a first graphical symbol to the voxels, or the like, or a combination there of. When a voxel is marked, the voxel may be assigned a third number, or a third graphical symbol, or the like, or a combination there of.

In step 907, another judgment may be conducted to determine whether the identification of the voxels is done. If another voxel needs to be processed, it may jump to step 903. If the identification is completed based on a stopping condition, it may proceed to step 908. The stopping condition may be that all the voxels of the image are retrieved and/or assessed in one or more of step 903 through step 906.

After the voxels are processed, an object voxel mask may be generated in step 908. The mask may classify the voxels into different categories (also referred to as sets). One exemplary category of voxels may be the voxels marked in step 906. The values of the voxels of this category may be assigned, and do not need to be calculated during at least part of the iterations (e.g., the backward projection, the forward projection, etc.). Accordingly, the estimated projection error may be zero. See the description elsewhere in the present disclosure at, for example, FIG. 13 and the description thereof. Further, the mask may be modified due to, for example, the lack of the reliability of the previous judgment. In some embodiments, an eroding operation may be used to reshape the scale of the object voxels, based on which the area relating to object voxels may be adjusted. Merely by way of example, if the initial image subject to step 901 is inaccurate with respect to one or more parameters (e.g., boundary, position, etc.) of the object, some voxels may be marked as object voxels by mistake. As used herein, the eroding operation may refer to a process for adapting or revising the scale where one or more object voxels are marked. For example, the scale may be reduced so that fewer object voxels are enclosed in the scale.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. In one example, the sequence in the flowchart may be adjusted that the calculation of local average value of a voxel may be conducted after retrieving a voxel of the initial image. The checking of the first look-up table may be after the checking of the second look-up table. In another example, the voxel value of a voxel itself other than the local average value may also be used for the identification of the voxel.

Figure 10:
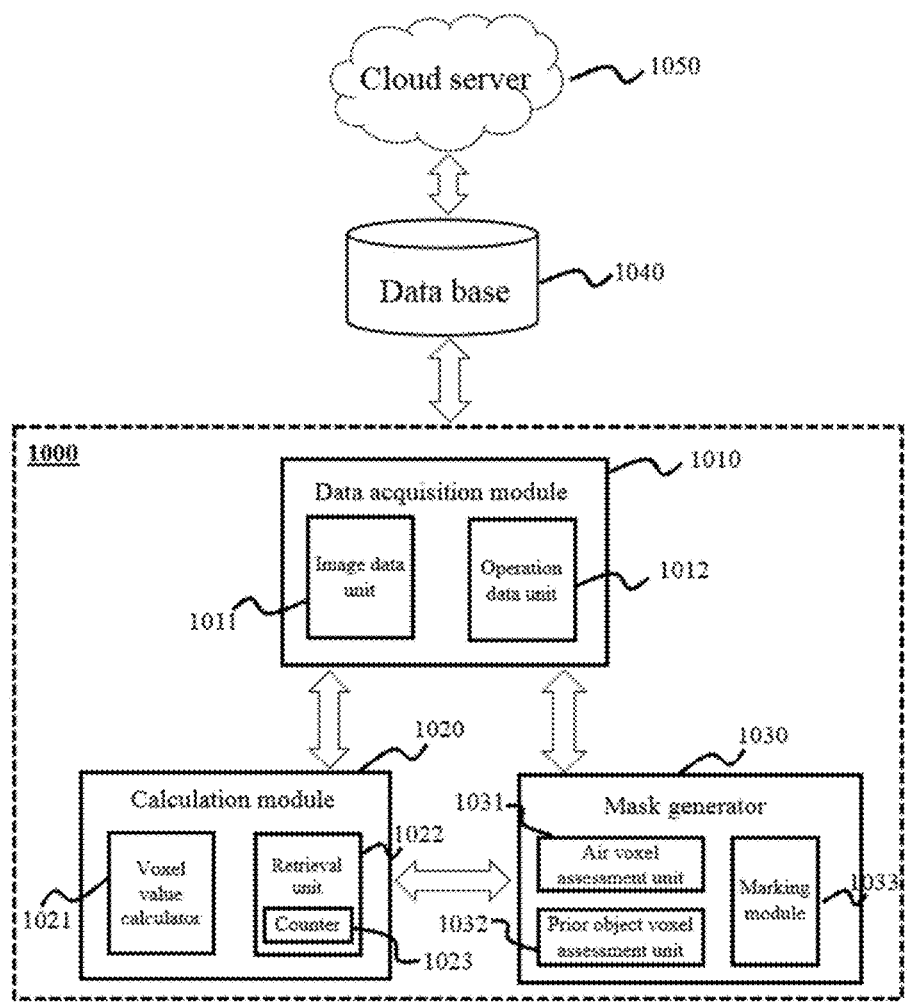
FIG. 10 is a block diagram of a mask generation engine according to some embodiments of the disclosure.

FIG. 10 shows a mask generation engine 1000 according to some embodiments of the present disclosure. The engine 1000 may include a data acquisition module 1010, a calculation module 1020, and a mask generator 1030. The data acquisition module 1010 may retrieve or acquire data relating to an image to be reconstructed. The calculation module 1020 may perform the calculation as described in, for example, FIG. 7, FIG. 8, and/or FIG. 9. The mask generator 1030 may generate, in the data relating to image reconstruction, a mask including, for example, an air voxel mask, an object voxel mask, or the like, or a combination thereof. The data acquisition module 1010, the calculation module 1020, and the mask generator 1030 may be connected to each other via a wired or wireless connection. The engine 1000 may further communicate with a database 1040. The database 1040 may be stored in a local storage device (e.g., the storage module 140) or connected to a cloud server 1050.

The data acquisition module 1010 may include an image data unit 1011 and an operation data unit 1012. The image data unit 1011 may acquire or retrieve data relating to image processing based on the raw data. The operation data unit 1012 may acquire or retrieve operation data based on a default setting of the system or a setting provided by a user (for example, an imaging technician, a doctor, etc.). Exemplary operation data may include a scan time, a location of the object, the location of a couch on which the object lies, or a rotating speed of the gantry, a specific parameter relating to a threshold that may be used by the calculation module 1020 and/or the mask generating module 1030 for generating a mask, or the like.

The calculation module 1020 may include a voxel value calculator 1021 and a retrieval unit 1022. The voxel value calculator 1021 may calculate a value relating to a voxel in an image. Merely by way of example, the local average value relating to a voxel as being calculated in step 802 as described above may be calculated by the voxel value calculator 1021 based on an image acquired previously. In some embodiments, the voxel value calculator 1021 may further be used to perform the forward projection and/or the backward projection during the iterative image reconstruction. The retrieval unit 1022 may include a counter for monitoring the progress of calculation during, for example, the generation of a mask, and/or the iterative image reconstruction. As an example, the counter may be used to count the number of voxels retrieved; the number may be used as a basis to determine whether a calculation may be ended as described in, for example, FIG. 8, FIG. 9, etc.

The mask generator 1030 may include an air voxel assessment unit 1031, a prior object voxel assessment unit 1032, and a marking module 1033. The air voxel assessment unit 1031 may recognize an air voxel based on the corresponding local average value calculated by the calculation module 1020. As an example, a voxel may be deemed to be an air voxel on the basis that the local average value relating to the voxel is below a threshold. The prior object voxel assessment unit 1032 may recognize a voxel corresponding to a prior object (e.g., a couch) based on the corresponding local average value calculated by the calculation module 1020. As an example, a voxel may be deemed to be a prior voxel on the basis that the local average value relating to the voxel matches a first reference value in a first look-up table.

As another example, a voxel may be recognized as a prior voxel on the basis that the coordinate of the voxel matches a reference value in a second look-up table. As still another example, a voxel may be recognized as a prior voxel on the basis that the local average value relating to the voxel matches a first reference value in a first look-up table and the coordinate of the voxel matches a second reference value in a second look-up table. In some embodiments, the first look-up table may include one or more reference values relating to the value(s) or the local average value(s) of a voxel corresponding to a prior object. Merely by way of example, the couch, an exemplary prior object, may contain different materials. For different materials, the voxel values or the local average voxel values may be different in a CT image. The information of different materials and their corresponding voxel values or local average voxel values may be stored in the first look-up table. In some embodiments, the second look-up table may include one or more reference values relating to the coordinate or the geometric location of a voxel corresponding to the prior object. For example, as mentioned before, the couch may contain different materials, and the positions of the different materials may be predetermined. The voxel values of the couch may be assigned based on the predetermined positions and the materials at the predetermined positions. The information of the positions including, for example, coordinate or geometric locations, corresponding to the different materials may be stored in the second look-up table. The first look-up table and/or the second look-up table may be stored in a local storage device (e.g., the storage module 140), or may be retrieved from a remote storage device (e.g., the cloud server 1050). In some embodiments, the first look-up table and the second look-up table may correlate to each other. For instance, voxels with different coordinates may correspond to different voxel values or local average values. Specifically, the voxel value corresponding to a specific location on a couch (e.g., the location where a patient's head may lie on) may change in the cases when the couch moves from a first location to a second location during scanning. The first look-up table and the second look-up table may be both referred in recognizing a prior object voxel. The marking module 1033 may mark a voxel as an air voxel or a prior object voxel with a designated sign for further use based on the recognition of the air voxel assessment unit 1031 and the prior object voxel assessment unit 1032.

It shall be noticed that the functional blocks are not necessarily indicative of the division between hardware circuitry. For example, one or more of the functional blocks (e.g., the data acquisition module 1010, the calculation module 1020, the mask generator 1030, etc.) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like.

Due to the cone beam geometry in the radiation imaging system, even if each voxel has the same geometry size, the shadow range casting each voxel onto the detector as described in Equation (4) may be different. FIG. 11-A and FIG. 11-B are diagrams of the footprint shadow ranges of forward projection and/or backward projection according to some embodiments of the disclosure. In both figures, the radiation source is represented by a point S, and the radiation beams (for example, radiation beams passing through an object) may project a shadow relating to the object on a detector 1101.

As shown in FIG. 11-A, blocks "1," "2," and "3" may denote three voxels of the image being reconstructed. All of the three blocks may be located between the radiation source S and the detector 1101. The block "1" may be located on the left side of the block "2," meaning that the voxel "1" may be located closer to the radiation source than the voxel "2." In some embodiments, the footprint shadow range of a voxel may be represented by the number of detector cells involved in the footprint shadow range on the detector 1101. In some embodiments, the footprint shadow range of a voxel may be represented by a length of the footprint shadow range in one direction. For illustrative purposes, the direction shown in FIG. 11-A and FIG. 11-B is along the t-axis on the coordinate locating on the detector as illustrated in FIG. 5. As illustrated in FIG. 11-A, the footprint shadow range of the voxel "1" and the voxel "2" along the t-axis are indicated by the letter "a" and the letter "b", respectively. The length "a"/"b" may indicate the distance from the uppermost point of a radiation ray passing through the voxel "1"/"2" on the detector 1101 to the bottommost point of a radiation ray passing through the voxel "1"/"2" on the detector 1101. Thus, a larger scale or dimension relating to more detector cells on the detector 1101 may be covered by the footprint shadow range of the voxel "1" than that of the voxel 2." Similarly, the voxel "3" may be located right below the voxel "1." The footprint shadow range of the voxel "3" along the t-axis may be indicated by the letter "c" as illustrated in FIG. 11-A. The specific number of detector cells covered by the footprint shadow range of a voxel may be determined by one or more factors. Exemplary factors may include the size of the voxel, the size of a detector cell (e.g., the shadow range may be represented by the number of detector cells), the location of the voxel with respect to the radiation source and/or the detector, the geometric shape of the radiation beams, or the like, or a combination thereof. It shall be noted that any direction may be used to identify the scale or dimension of the footprint shadow range along that specific direction.

As shown in FIG. 11-B, the voxel "1" may be divided into a number of sub-voxels (e.g., four as illustrated in FIG. 11-B). A sub-voxel "A" may project a footprint shadow range that forms a portion of the original voxel "1," and the footprint shadow range thereof along the t-axis may be indicated by the letter "a'". The length a' may be a fraction of the length a. The fraction may be any value within the range of 0 to 1. For example, the fraction may be between the range (0, 1/10), or (0, 1/8), or (0, 1/6), or (0, 1/4), or (0, 1/6), or (0, 1/4), or (0, 1/2), or (0, 2/3). The fraction may correspond to the pattern according to which the original voxel is divided. In some embodiments, the original voxel may be divided into two sub-voxels, or four sub-voxels, or six sub-voxels, or nine sub-voxels, etc. In some embodiments, the shapes of sub-voxels may be identical. For example, a square original voxel "1" may be divided into four identical square sub-voxels. In some embodiments, the shapes of sub-voxels may be different. In some embodiments, the division may be performed in the slice-direction (the z direction). Merely by way of example, a thick voxel may be divided into a number of thin sub-voxels in the z direction. In some embodiments, the division may be performed in the x-y plane. Merely by way of example, a voxel may be divided into four sub-voxels in the x-y plane, and one or more of the four sub-voxels may have the same thickness as the original voxel. In some embodiments, the division may be performed in both the slice-direction an in the x-y plane.

It shall be noted that the footprint shadow range of the voxels described in FIG. 11-A and FIG. 11-B may be reflected in more than one dimension, and the difference of the footprint shadow range in different dimensions may correspond to different detector cells. For example, the voxel "2" may correspond to a 2 by 2 array of detector cells, and therefore 4 detector cells; the voxel "1" may correspond to a 3 by 3 array of detector cells, and therefore 9 detector cells. As another example, the voxel "2" may correspond to a 2 by 3 array of detector cells, and therefore 6 detector cells; the voxel "1" may correspond to a 3 by 4 array of detector cells, and therefor 12 detector cells. In some embodiments, the division of a voxel may depend on the detector cells corresponding to the footprint shadow range of the voxel in different dimensions. For example, the voxel "1" may be divided into 4 sub-voxels if the voxel "1" may correspond to 3 by 3 detector cells; the voxel "2" may be divided into 2 sub-voxels if the voxel "2" may correspond to 2 by 2 detector cells. As another example, the voxel "1" may be divided into 9 sub-voxels if the voxel "1" may correspond to 3 by 4 detector cells; the voxel "2" may be divided into 4 sub-voxels if the voxel "2" may correspond to 2 by 3 detector cells.

FIG. 12-A and FIG. 12-B are two examples indicating the footprint shadow range distribution with a 512×512 image matrix.

The view angle may be located in $(2n+1)*pi/4$, where n is an integer. As shown in FIG. 12-A, the radiation source is located at the top left corner. The scale bar in FIG. 12-A indicates a correlation between the color and the level or size of the footprint shadow range. The darker the color is, the smaller the footprint shadow range of a voxel is. The level or size of the footprint shadow range of a voxel may depend on factors including, for example, the distance between the voxel and the radiation source, the location of the voxel relative to the radiation source and the detector or detector cells, or the like, or a combination thereof. At the top left corner of the matrix, the voxels may be closer to the radiation source (compared to voxels in the other regions of the image matrix), the color may be the lighter, indicating that the footprint shadow ranges of the voxels in this region may be larger than elsewhere in this image matrix. When the distance between the radiation source and voxels get larger, the colors may get darker, indicating that the footprint shadow ranges of the voxels get smaller. The distribution of the foot shadow ranges of voxels illustrated herein may correspond to FIG. 11 and the description thereof. In the lower left corner and the top right corner, there are two triangle regions with the darkest color, indicating zero footprint shadow range of the voxels due to the shape of the radiation beams.

The view angle may be located in $2n*pi/4$, which means that the radiation source is located in the middle of the left side of the image matrix. As shown in FIG. 12-B, the region closer to the radiation source may correspond to the lighter color and the larger footprint shadow range of a voxel. The footprint shadow range may decrease with the distance to the radiation source getting farther. There are two triangle regions in the top left corner and the lower left corner of the image matrix where the color is the darkest, indicating no projected footprint shadow ranges for the voxels located in either of the two regions.

Figure 13:
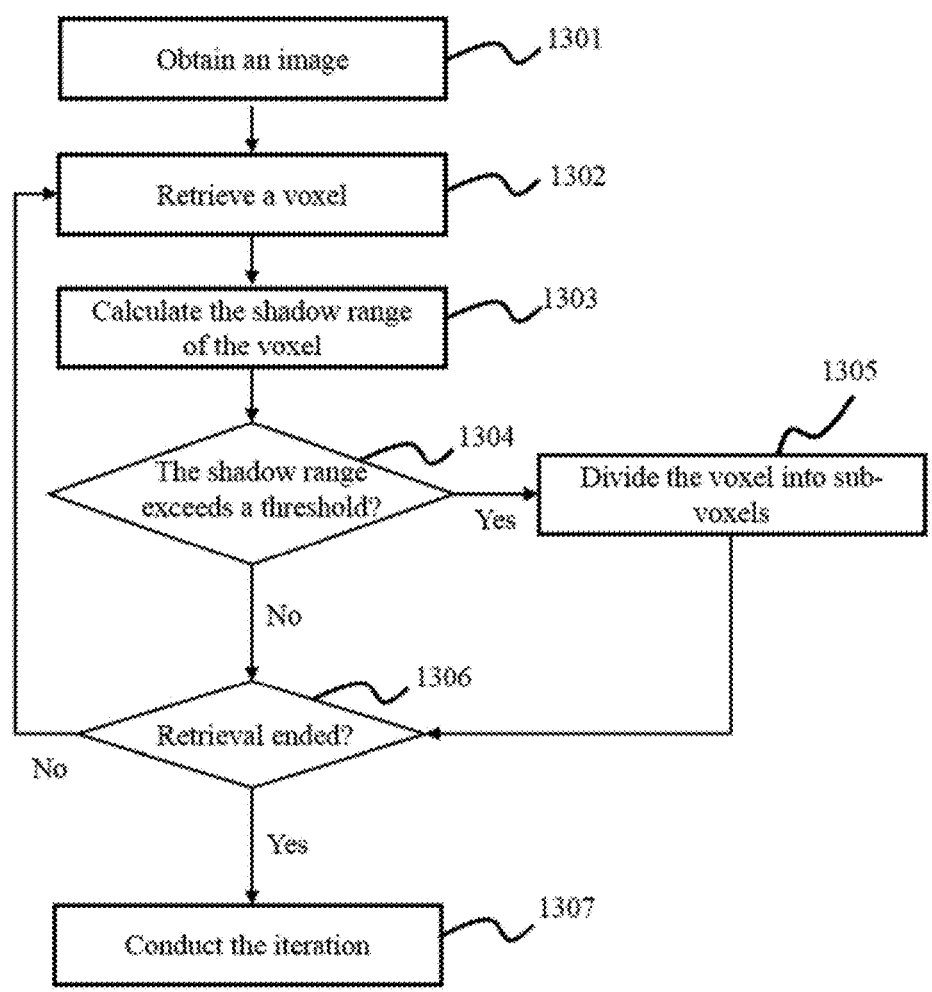
FIG. 13 is a flowchart illustrating a process for voxel division according to some embodiments of the present disclosure.

In some embodiments, part of the voxels may be divided into sub-voxels to achieve a substantially uniform shadow range for each of the voxels and sub-voxels. FIG. 13 is a flowchart illustrating a process for voxel division according to some embodiments of the present disclosure. In step 1301, an image may be obtained. In step 1302, a voxel relating to the image obtained in step 1301 may be retrieved.

In some embodiments of the present disclosure, the retrieval may start from the first voxel of the image, to the last one of the image, or from the center of the image to the edge area, or from an area that is likely to be of interest to an insignificant area, or the like, or any combination thereof. As described elsewhere in the disclosure, the footprint shadow range of a voxel on the detector may relate to the location of the voxel. For instance, a voxel may produce a larger footprint shadow range if the voxel is located closer to the radiation source than a voxel located far away from the radiation source. Voxels located in different regions may be retrieved differently. In some other embodiments, the voxels in a certain region may be retrieved one by one, or every other voxel, or every several other voxels, or the like, or a combination thereof.

For a voxel retrieved from the image, the footprint shadow range may be calculated in step 1303. As described elsewhere in the disclosure, the footprint range of a voxel may relate to one or more parameters. Exemplary parameters may include the beam geometry of the radiation source, the shape of the voxel, the geometry size of the detectors, the location of the voxel, the size of the voxel, or the like, or a combination thereof. In some embodiments, exemplary beam geometries may include, but not limit to, a cone beam geometry, a parallel beam geometry, a fan beam geometry, or the like, or a combination thereof. As used herein, the shape of a voxel may include, but not limit to, a cuboid model, a polar grids model, a wavelet model, an overlapping circles or spheres model, a disk model, a polygon model, etc. According to the description elsewhere in the present disclosure, the footprint range of a voxel may depend on factors including, for example, the distance from the radiation source, the size of the voxel, or the like, or a combination thereof. Merely by way of example, a voxel may have a large footprint range if its location is close to the radiation source, or if its size is large; a voxel may have a small footprint range if it is located far away from the radiation source, or if its size is small, or both.

It shall be noticed that the calculation of the footprint shadow range of a voxel may be conducted before the retrieval of a voxel. In some embodiments, after an initial image is obtained, all the footprint shadow range of voxels of the image may be calculated according to a group of given parameters, such as the geometry of the radiation beams, the position of the radiation beams, the size and layout of the detector cells, or the like, or a combination thereof. After the calculation, the process may proceed to retrieve the voxel of the initial image.

A judgment may be conducted after step 1303. The voxels may be separated or classified into at least two categories according to a threshold. If the shadow range of a voxel is above the threshold, the voxel may be divided or treated as several voxels during subsequent processing. If the shadow range of a voxel is below the threshold, it may proceed to step 1306. The threshold may be determined in a plurality of ways. In some embodiments, the threshold may be set by a default setting based on, for example, operation parameters, the system design, or the like, or a combination thereof. For example, the threshold may relate to the area of the footprint shadow ranges on the detector, the length of the footprint shadow ranges on the detector, or the like, or a combination thereof.

In some embodiments, the threshold may be set based on the time of parallel calculation. As used herein, the parallel calculation may refer to a calculation process that a plurality of voxels may be simultaneously processed. In a parallel calculation, the time to be consumed may be determined by the calculation speed of the voxel that costs the longest time. The calculation speed of a voxel may relate to the number of detector cells covered by a footprint shadow range. Thus, in order to achieve a desired time of calculation, the threshold may be that a footprint shadow range covers a threshold number of detector cells; that is, the ratio of the footprint shadow range to the dimension of a detector cell does not exceed the threshold number. As used herein, "exceed" a threshold may include being greater or lower than a threshold. The threshold number may be, e.g., 1.5, or 2, or 2.5, or 3, or 4, or 5, or larger than 5. As used herein, the dimension of a detector cell may relate to the length or width of the detector cell if the detector cell is rectangular, or the radius of the detector cell is the detector is in a circular shape, or the area of the detector cell. In some other embodiments, the threshold may be set based on a statistic result. For example, after calculating the footprint shadow ranges of all or a portion of the voxels, the threshold may be determined by the distribution of the footprint shadow ranges of the calculated voxels. For example, the threshold may be set so as to determine a percentage of voxels to be divided in the subsequent step. The percentage may be fifty, sixty, seventy, or any value between zero to one hundred.

Referring back to FIG. 13, if the footprint shadow range exceeds the threshold, the process may proceed to step 1305. The retrieved voxel may be divided into a number of sub-voxels. The voxel may be divided in the image slice direction (the z direction), or into several sub-voxels in the x-y plane. The number may be two, four, six, eight, or any positive integer. In some embodiments, the separate sub-voxels of a voxel may be of a same size. In some embodiments, at least two of the separate sub-voxels of a voxel may be of different sizes. The shape of the sub-voxels may be based on the shape of the voxel being divided. Exemplary shape of the sub-voxels may include cubic, cylinder, sphere, polyhedron, or the like, or a combination thereof. If two voxels produce a same shadow range, or the difference of the shadow ranges of the two voxels stay within a certain range, the two voxels may be processed in a similar way, including using the same calculating parameters, models, algorithms, or the like, or a combination thereof. The sub-voxels obtained by the division may have a more uniform footprint shadow range than the origin voxel, thus may accelerate the calculation speed and reducing the computation time. In some embodiments, the division may be conducted based on the rule of keeping the sum of the contributions of the sub-voxels equal to the original voxel contribution. The number of the sub-voxels divided from an original voxel may be constant or changeable during the process.

In the step 1306, another judgement may be conducted to determine whether the retrieval is completed. Different kinds of stopping conditions may be adopted to stop the retrieval. In some embodiments, the retrieval may be stopped when every voxel of the image is retrieved. In some embodiments, the retrieval may be stopped when the voxels belong to the interested area are retrieved. If the retrieval is done, an iteration may be conducted to reconstruct the image.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, a series of thresholds may be used in determination of the division process. For example, there may be a first threshold and a second threshold. If the footprint shadow range is above the first threshold and below the second threshold, the origin voxel may be divided into a first number of sub-voxels. If the footprint shadow range is above the second threshold, the origin voxel may be divided into a second number of sub-voxels. The number of the threshold level may be two, or three, or any positive integer. In some embodiments, the division of a voxel may vary during an iterative reconstruction process. For example, a voxel may be divided into a first number of sub-voxels during one or more iterations of an image reconstruction process and may be divided into a second number of sub-voxels during a second image reconstruction process.

Figure 14:
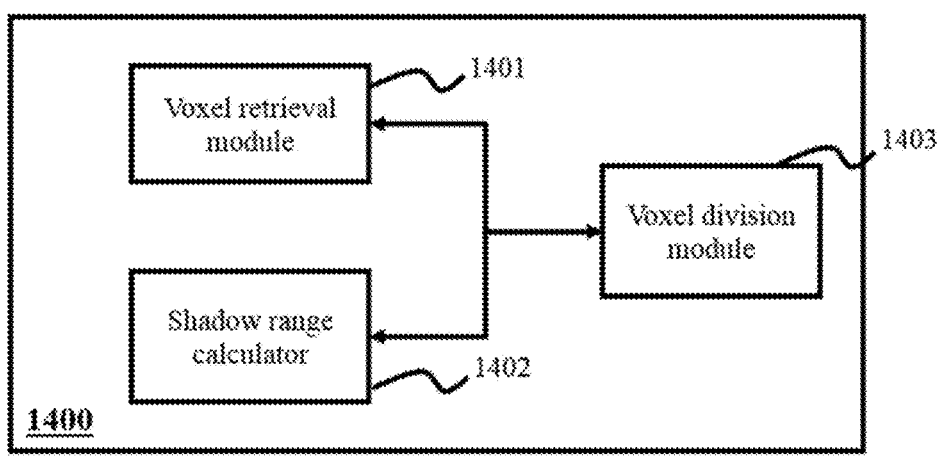
FIG. 14 is a block diagram of a voxel division engine according to some embodiments of the disclosure.

FIG. 14 shows a voxel division engine 1400 according to some embodiments of the present disclosure. The engine 1400 may include a voxel retrieval module 1401, a shadow range calculator 1402, and a voxel division module 1403. The voxel retrieval module 1401 may retrieve voxels as described in step 1302. In some embodiments, the voxel retrieval module 1401 may perform the same function as the retrieval unit 1022 as described in FIG. 10, and a counter may record the number of voxels being retrieved. In some embodiments, the mask generation engine 1000 and the voxel division engine 1400 may share a same voxel retrieval unit or module to retrieve voxels for subsequent processing.

The shadow range calculator 1402 may calculate the shadow range of a voxel based on, for example, the size of the voxel, the size of a detector cell, the location of the voxel with respect to the radiation source and the detector, the geometric shape of the radiation beam, or the like, or a combination thereof. In some embodiments, the shadow range may be specifically programmed to perform the calculation of, for example, Equation (4).

The voxel retrieval module 1401 and the shadow range calculator 1402 may be coupled to the voxel division module 1403 by which a voxel may be determined to be divided into sub-voxels based on the shadow range thereof. In some embodiments, the number of sub-voxels divided may depend on the shadow range of the respective voxel. For example, if the shadow range of the voxel exceeds a first threshold, a first number of sub-voxels may be divided; if the shadow range of the voxel exceeds a second threshold, a second number of sub-voxels may be divided. The first number may be different from the second number.

It shall be noticed that the functional blocks are not necessarily indicative of the division between hardware circuitry. For example, one or more of the functional blocks (e.g., the voxel retrieval module 1401, the shadow range calculator 1402, and/or the voxel division module 1403) may be implemented in a single piece of hardware (e.g., a general purpose signal processor or random access memory, hard disk, or the like) or multiple pieces of hardware. Furthermore, the mask generation engine 1000 and the voxel division engine 1400 may at least share a common processor or microprocessor. The instructions to perform functions in respective system may be executed simultaneously, or in an organized order. For example, the masks may be generated before, after or at the same time of voxel division.

Figure 15:
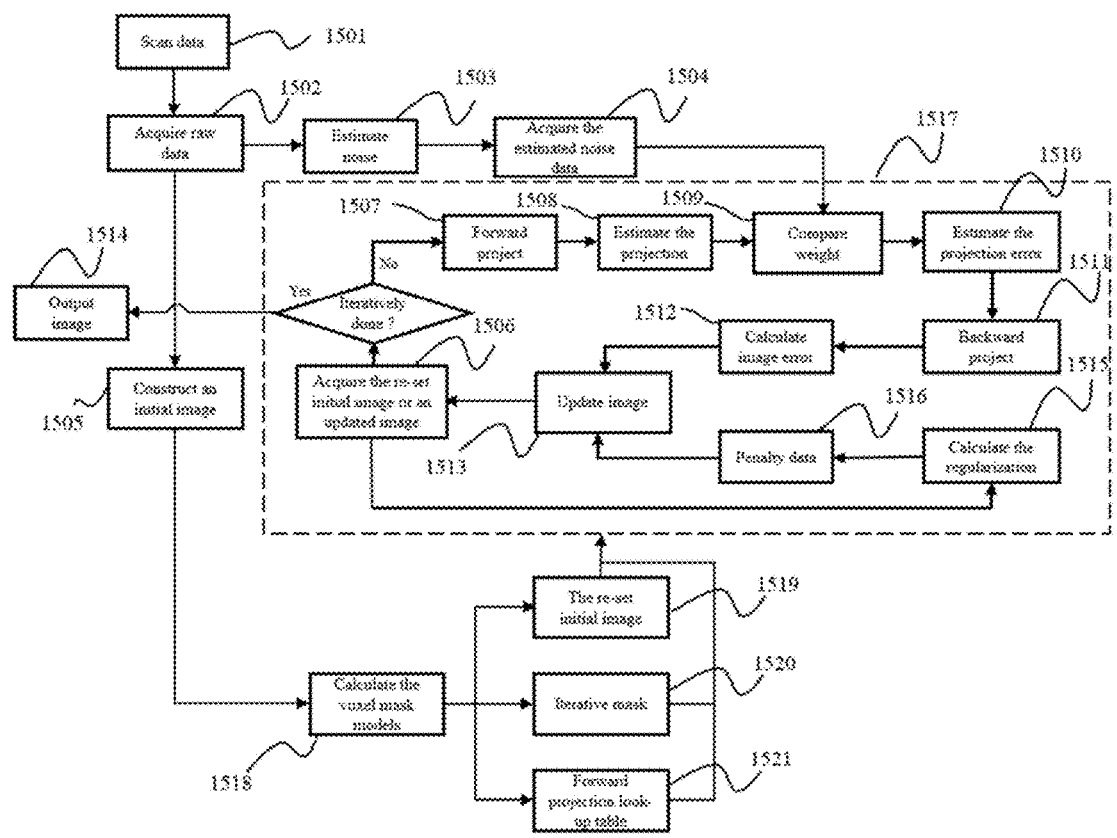
FIG. 15 is a flowchart illustrating a process for iterative reconstruction according to some embodiments of the present disclosure.

FIG. 15 illustrates an exemplary flowchart of a process of an image reconstruction according to some embodiments of the present disclosure. Raw data may be acquired in step 1502 through, for example, a scan process in step 1501. At least two different processing ways may be conducted based on the raw data acquired in step 1502. Merely by way of example, the raw data may be generated by a CT scan in step 1501, or it may be obtained from other resources (e.g., a computer-simulated scan). An initial reconstruction may be performed in step 1505 based on the raw data acquired in step 1502, where an initial image may be generated. As described elsewhere in the disclosure, the initial reconstruction according to a reconstruction algorithm may generate an initial image relating to the object. Examples of such reconstruction algorithms may include those based on Feldkamp-Davis-Kress (FDK) reconstruction, maximum a posteriori probability (MAP), maximum likelihood (ML), algebraic reconstruction technique (ART), entropy-based optimization, least squares (LS) or penalized weighted least squares (PWLS), filtered back projection, or the like, or a combination thereof. The described algorithms may be executed once, or may be executed iteratively. In some embodiments, the initial image may also be appropriately set by default. For example, an edge outline of the object may be set as the initial reconstruction. Additionally, the raw data acquired in step 1502 may proceed to noise estimation in step 1503, and an estimated noise data may be generated in step 1504. A noise model may be acquired by noise estimation in step 1503, which may be conducted by a noise reduction unit (not shown in FIG. 15). The noise estimation in step 1503 may include estimating the noise contained in the raw data acquired in step 1502 by fitting one or more noise models to the estimated noise. As used herein, the noise may include electronic noises that may be generated by an electronic device, e.g., a sensor, the circuitry of the scanner, or the like, or a combination thereof. The noise model(s) may indicate the noise distribution of an image, noise amplitude at respective point(s) of an image, or the like, or a combination thereof.

The reconstruction described may include an iterative reconstruction process that may include a computer based iterative processing. The iterative reconstruction process may include repeated projections and noise elimination processes, etc. The above mentioned examples of models are provided for illustration purposes and not intended to limit the scope of the present disclosure.

After the initial image is constructed, a plurality of voxel mask models may be calculated in step 1518. As described elsewhere in the present disclosure, the voxel mask model may be used to generate an air voxel mask, an object voxel mask, or the like, or a combination thereof. In some embodiments, the different masks may be merged together. For example, the voxels located in air and the voxels located in a prior object may be merged as a new group of voxels, and the new group may be called prior voxels, or the like.

After step 1518, at least three steps may be performed based on the voxel mask models. In step 1519, a re-set initial image may be generated, meaning that the voxel values of the initial image are re-set based on at least one of the voxel mask models. In some embodiments, for a certain voxel marked in any one of the previous steps, the corresponding voxel value may be set to a prior value according to information store in, for example, a database. The information may be pre-calculated according to, for example, the design parameters, or may be set by default according to previous experience.

In step 1520, an iterative mask may be generated. In some embodiments, the iterative mask model may be generated by merging or partially merging the various kinds of masks. In some embodiments, the iterative mask may be used during each iteration or a part of the whole iterations. The mask determines the way a voxel of the image to be processed in the iteration process.

In step 1521, a forward projection look-up table may be generated according to the voxel mask model. The forward projection look-up table may include parameters relating to forward projection. As described elsewhere in the disclosure, the forward projection contributions of the prior object voxels for a radiation beam and a view angle may be pre-calculated. In some embodiments, the pre-calculated contributions of the prior object voxels may be stored as a forward projection look-up-table. The subsequent forward projection during the iterative reconstructions may only calculate the contributions from the other non-prior voxels and then merge them with the pre-calculated contributions.

An iterative reconstruction of image(s) in the dash box 1517 may relate to a noise estimation process. During the first iteration, an initial image or the re-set initial image obtained in step 1519 may be acquired in step 1506 by the direct input of the re-set initial image in step 1519; while in a subsequent iteration, the image in step 1506 may be updated by a reconstructed image generated from the previous iteration. A determination may be made regarding whether the iteration is completed after step 1506. If the iteration is completed, the process may proceed to output the image in step 1514. In some embodiments, the output image obtained in step 1514 may be further optimized in the following steps, e.g., enhancing contrast. If further iteration is needed, it may proceed to step 1507, in which a forward projection may be carried out. There may be different kinds of stopping conditions to determine whether the iteration is completed. In some embodiments, the stopping conditions may relate to one or more parameters set in the system. For example, the stopping condition may be that the difference between the reconstructed images from the current iteration and the previous iteration is below a certain threshold. In other embodiments, the stopping conditions may be determined by a user. For example, the clinical images relating to a certain tissue after several iterations may be accepted by a doctor.

The forward projection in step 1507 may be a computer-based projection that may transform either the initial image or the reset initial image in the first iteration or the updated image in other iterations into data domain. Merely by way of example, a voxel (or pixel) in a 3D (or 2D) image (e.g., the initial image, the re-set initial image, or the updated image) may include information relating to the projection. The information may include, but not limit to, the geometry of the voxel (e.g., the shape, the position, the size, or the like, or a combination thereof) and the voxel (or pixel) value (e.g., the distribution of the gray scale, the distribution of the RGB level, the distribution of the brightness, or the like, or a combination thereof), or the like, or a combination thereof. As described elsewhere in the disclosure, the shadow range casting each voxel onto the detector may be different due to the cone beam geometry of the radiation source, the shape of the voxel, the location of the voxel, the size of the voxel, or the like, or a combination thereof. During the forward projection, part of the voxels may be divided into sub-voxels to achieve a substantially uniform shadow range for each of the voxels and sub-voxels, as shown in FIG. 11. Additionally, the forward processing mask may be used to provide the pre-calculated forward projection contributions of the prior object voxels, and/or the iterative mask may be used to identify the air voxels that will not be calculated during the forward projection. An estimated projection may be performed in step 1508 based on the forward projection in step 1507.

In step 1509, a weighted comparison may be performed based on, for example, the estimated noise data obtained in step 1504 and the estimated projection obtained in step 1508. In some embodiments, the estimated noise data obtained in step 1504 may include at least one parameter relating to at least one noise model fit to the estimated noise generated in the noise estimation in step 1503.

In some embodiments, the weighted comparison in step 1509 may include identifying a correlation between the estimated projection obtained in step 1508 and the estimated noise data obtained in step 1504 and generating a weighted estimation based on the correlation. In step 1510, a projection error may be identified. The projection error may be generated based on the noise model obtained in step 1504 and the weighted estimation obtained in step 1509 based on the correlation between the estimated projection obtained in step 1508 and the estimated noise data obtained in step 1504. The projection error may be further transformed back, for example, by way of a backward projection, in step 1511 to the image domain to provide an image error in step 1512. In step 1513, the image error generated in step 1512 may be used to update the image in combination with penalty data generated in step 1516. The penalty data may be obtained from a regularization calculation performed in step 1515 based on either the initial image, the re-set initial image in the first iteration or the updated image in other iterations. As described herein, the regularization calculation may characterize an inherent property of the CT system and preserve some characteristics within the image. Exemplary characteristics may include the sharp edge between a high intensity region and a low intensity region. In some embodiments, the regularization calculation may help enhance the quality of the image by, for example, improving the smoothness within a high intensity region or a low intensity region. In some embodiments, the regularization calculation performed in step 1515 may distinguish regions with different intensity. For example, the regularization calculation performed in step 1515 may be helpful in understanding the position of a metal implant inside the body of a patient. The regulation calculation may increase the visibility of a sharp edge between the metal and a non-metal tissue.

Based on the penalty data obtained in step 1516 and/or the image error obtained in step 1512, an image may be updated in step 1513. For instance, the update may be based on the multiplication of the penalty data and the image error. The update may improve the quality of the image obtained in the previous iteration. The process may be repeated for a certain number of iterations or until a criterion is met.

In some embodiments, the forward projection in step 1507 may be determined by the geometry relationship between the radiation source, the object, and the detector. For example, the contribution factor $\alpha(\gamma_k, t_i, \beta, \vec{n})$ may be determined by the relative locations of the radiation source, the object, and the detector. In some embodiments, the forward projection in step 1507 may be determined by the image voxel value or sub-voxel value $f(\vec{n})$. As used herein, the image voxel value or sub-voxel value $f(\vec{n})$ may include information relating to, e.g., the gray scale of a voxel, the RGB level of a voxel, the brightness of a voxel, or the like, or a combination thereof. Moreover, the distribution of the voxel values and/or the sub-voxel values in the image may be configured in different manners. For example, the image voxel value or the sub-voxel value $f(\vec{n})$ of two neighboring voxels may be either continuous or discretized. Specifically, the sub-voxel value of the sub-voxels forming an original voxel may be either continuous or discretized. It shall also be appreciated by persons having ordinary skills in the art that other physical effects may be further taken into account during the forward projection in step 1507. Examples of such physical effects may be a polychromatic X-ray spectrum, a finite detector point-spread function, a finite focal spot size, azimuthal blur, scattered radiation, measurement noise, or off-focal radiation, or the like, or a combination thereof.

In some embodiments, the backward projection in step 1511 may take into account the iterative mask that a portion of the voxels (e.g., as marked in FIG. 8) may be treated as air voxels which may not be calculated, and that a portion of the voxels (e.g., as marked in FIG. 9) may be treated as prior knowledge (e.g., prior object) which may not be conducted.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. For example, it shall be appreciated to those skilled in the art that the regularization calculation in step 1515 and the penalty data generated in step 1516 may be unnecessary. Thus, the image update in step 1513 may depend only on the image error in step 1512. Additionally, forward projection may be carried out in step 1507 or other appropriate parts of the process described in FIG. 15 in reality. In another example, the projection error generated in step 1510 may be used to update the estimated projection in step 1508, and the updated projection may be transformed back to the image domain by the backward projection in step 1511. As a result, the transformed image may be used in the following iterative steps as an updated image.

In some embodiments, a tangible and non-transitory machine-readable medium or media having instructions recorded thereon for a processor or computer to operate an imaging apparatus to perform one or more functions of the modules or units described elsewhere herein, for example, to implement the processes of generating voxel masks, or reconstructing images in subsequent processes, may be provided. The medium or media may be any type of CD-ROM, DVD, floppy disk, hard disk, optical disk, flash RAM drive, or other type of computer-readable medium or a combination thereof.

The various embodiments and/or components, for example, the modules, units, processors, components and controllers (e.g., control module 130), may be implemented as part of one or more computers or processors. The computer or processor may include a computing device, an input device, a display unit and an interface, for example, for accessing the Internet or communicating with a cloud server. The computer or processor may include a microprocessor. The microprocessor may be connected to a communication bus. The computer or processor may also include a memory. The memory may include Random Access Memory (RAM) and Read Only Memory (ROM). The computer or processor further may include a storage device including, for example, a hard disk drive or a removable storage drive such as a floppy disk drive, optical disk drive, or the like, or a combination thereof. The storage device may also be other similar means for loading computer programs or other instructions into the computer or processor. The computer or processor executes a set of instructions that are stored in one or more storage elements, in order to process input data. The storage elements may also store data or other information as desired or needed. The storage element may be in the form of an information source or a physical memory element within a processing machine.

Examples

The following examples are provided for illustration purposes, and not intended to limit the scope of the present disclosure.

FIG. 16-A and FIG. 16-B are two X-ray images that were generated based on iterative reconstruction according to some embodiments of the present disclosure. FIG. 16-A is the reconstruction image from the combined forward/backward projection in which an iterative mask was used. FIG. 16-B is a forward/backward projection without incorporating an iterative mask, and may be considered as a standard image. FIG. 16-C is an image showing the differences between FIG. 16-A and FIG. 16-B. Compared to FIG. 16-B, FIG. 16-A was acquired by the methods described elsewhere in the present disclosure. In FIG. 16-C the differences of the corresponding positions of FIG. 16-A and FIG. 16-B are shown. As illustrated in FIG. 16-C, and the area toward the center of the image, the inner ellipsoid region, represented the tissue area. As illustrated in FIG. 16-C, in the tissue area, the differences between FIG. 16-A and FIG. 16-B are hardly visible, indicating little or no visible noise or artifact from the background (e.g., the couch, the air voxels, etc.). The result may indicate the effectiveness of the iterative mask as described in the present disclosure.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, may be employed in various combinations by one of ordinary skill in this art to perform methods in accordance with the principles described herein.

Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) may be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein may be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Some embodiments of this application are described herein. Variations on those embodiments will become apparent to those of ordinary skill in the art upon reading the foregoing description. It is contemplated that skilled artisans may employ such variations as appropriate, and the application may be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method implemented on at least one computing device each of which has at least one processor and storage, the method comprising:
    retrieving raw data relating to a scanned portion of an object;
    generating an image based on the raw data;
    identifying a first voxel of the image, the first voxel corresponding to a first shadow range on at least one detector cell;
    determining whether the first shadow range exceeds a first threshold;
    in response to a determination that the first shadow range exceeds the first threshold, dividing the first voxel into a first number of sub-voxels; and
    reconstructing the image using an iterative reconstruction process comprising a plurality of iterations, wherein during an iteration of the plurality of iterations,
    a calculation relating to the first voxel is based on the first number of sub-voxels.

2. The method according to claim 1, wherein the first threshold relates to a dimension of the at least one detector cell.

3. The method according to claim 1 further comprising:
    identifying a third voxel, the third voxel corresponding to a third shadow range on the at least one detector cell;
    determining whether the third shadow range exceeds a third threshold; and
    in response to a determination that the third shadow range exceeds the third threshold, dividing the third voxel into a third number of sub-voxels, wherein
    the third number is different from the first number, and
    during an iteration of the plurality of iterations, a calculation relating to the third voxel is based on the third number of sub-voxels.

4. The method according to claim 1, further comprising:
    identifying a fourth voxel of the image based on a plurality of neighboring voxels, wherein the fourth voxel is omitted during one or more iterations of the plurality of iterations.

5. The method according to claim 4, wherein a local average value relating to the neighboring voxels exceeds a fourth threshold.

6. The method according to claim 4, further comprising:
    retrieving a first look-up table, wherein a local average value relating to the neighboring voxels matches a first reference value in the first look-up table.

7. The method according to claim 4, further comprising:
    retrieving a second look-up table, wherein a coordinate of the fourth voxel matches a second reference value in the second look-up table.

8. The method according to claim 4, wherein the fourth voxel represents a portion corresponding to a couch area or an air portion in the object.

9. The method according to claim 4, wherein the value of the fourth voxel is predetermined.

10. A method implemented on at least one computing device each of which has at least one processor and storage, the method comprising:
    retrieving raw data relating to a scanned portion of an object;
    generating an image based on the raw data;
    identifying a first voxel of the image;
    determining whether a plurality of neighboring voxels of the first voxel satisfies a condition; and
    in response to a determination that the plurality of neighboring voxels of the first voxel satisfies the condition, reconstructing the image using an iterative reconstruction process comprising a plurality of iterations, wherein the first voxel is omitted during one or more iterations of the plurality of iterations.

11. The method according to claim 10, wherein the value of first voxel is predetermined.

12. The method according to claim 10, further comprising:
   identifying a second voxel of the image based on a second geometric parameter relating to the second voxel;
   dividing the second voxel into a second number of sub-voxels; and
   identifying a third voxel of the image based on a third geometric parameter relating to the third voxel, wherein during one or more iterations of the plurality of iterations,
   a calculation relating to the second voxel is based on the second number of sub-voxels, and
   a calculation relating to the third voxel is based on the third voxel.

13. The method according to claim 12, wherein the second geometric parameter comprising a shadow range projected by the second voxel on at least a detector cell, and the shadow range exceeds a second threshold.

14. The method according to claim 13, wherein the second threshold relates to a dimension of the detector cell.

15. A system comprising:
   at least one storage device including a set of instructions; and
   at least one processor in communication with the at least one storage device, wherein when executing the instructions; the at least one processor is configured to cause the system to:
   receive raw data relating to a scanned portion of an object for generating an image;
   calculate a shadow range of a first voxel of the image;
   determine whether the shadow range of the first voxel exceeds a threshold;
   in response to a determination that the shadow range of the first voxel exceeds the threshold, divide the first voxel into a first number of sub-voxels; and
   reconstruct the image using an iterative reconstruction process comprising a plurality of iterations,
   wherein a calculation relating to the first voxel is based on the first number of sub-voxels.

16. The system according to claim 15, wherein the at least one processor is further configured to cause the system to generate a mask relating to the image,
   wherein the mask identifies a third voxel of the image based on a plurality of neighboring voxels, and the third voxel is omitted during one or more iterations of the plurality of iterations.

17. The system according to claim 16, wherein the at least one processor is further configured to cause the system to assess a local average value of the third voxel.

* * * * *